(12) United States Patent
Hsu et al.

(10) Patent No.: US 12,541,072 B2
(45) Date of Patent: Feb. 3, 2026

(54) IMAGING LENS ASSEMBLY AND ELECTRONIC DEVICE

(71) Applicant: LARGAN PRECISION CO., LTD., Taichung (TW)

(72) Inventors: Chih-Wen Hsu, Taichung (TW); Hsiu-Yi Hsiao, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 337 days.

(21) Appl. No.: 18/192,837

(22) Filed: Mar. 30, 2023

(65) Prior Publication Data

US 2023/0324645 A1 Oct. 12, 2023

Related U.S. Application Data

(60) Provisional application No. 63/328,757, filed on Apr. 8, 2022.

(51) Int. Cl.
*G02B 7/02* (2021.01)
*G02B 5/00* (2006.01)
*G03B 30/00* (2021.01)

(52) U.S. Cl.
CPC ............ *G02B 7/021* (2013.01); *G02B 5/005* (2013.01); *G03B 30/00* (2021.01)

(58) Field of Classification Search
CPC .................................. G02B 7/021; G02B 5/005
See application file for complete search history.

(56) References Cited

U.S. PATENT DOCUMENTS

| | | | |
|---|---|---|---|
| 9,304,233 B2 | 4/2016 | Kim | |
| 9,400,383 B2 | 7/2016 | Liang | |
| 10,841,471 B1* | 11/2020 | Chang | H04N 23/55 |
| 11,604,325 B2* | 3/2023 | Wu | G02B 5/005 |
| 2018/0196171 A1 | 7/2018 | Hsu et al. | |
| 2018/0321427 A1* | 11/2018 | Hsu | G02B 7/026 |
| 2020/0301246 A1* | 9/2020 | Seo | H04N 23/55 |
| 2023/0143018 A1* | 5/2023 | Liu | G02B 7/021 |
| | | | 359/811 |
| 2023/0204898 A1* | 6/2023 | Tsai | G02B 27/0006 |
| | | | 359/819 |
| 2023/0324645 A1* | 10/2023 | Hsu | G02B 27/0018 |
| | | | 359/738 |

FOREIGN PATENT DOCUMENTS

TW M490029 U 11/2014
TW M521747 U 5/2016

* cited by examiner

*Primary Examiner* — Rhonda S Peace
(74) *Attorney, Agent, or Firm* — McClure, Qualey & Rodack, LLP

(57) ABSTRACT

An imaging lens assembly includes a plurality of optical lens elements, a single-piece-formed light blocking sheet and a lens barrel. The lens barrel has a circular light-passing hole corresponding to the plurality of optical lens elements and the single-piece-formed light blocking sheet. The single-piece-formed light blocking sheet has a central aperture corresponding to the lens barrel and the plurality of optical lens elements. A maximum aperture diameter is defined by the central aperture. The single-piece-formed light blocking sheet comprises a plurality of light blocking structures surrounding and disposed adjacent to the central aperture. A minimum inner radius of the central aperture is defined near the center of each of the light blocking structures.

12 Claims, 21 Drawing Sheets

IMAGING LENS ASSEMBLY AND ELECTRONIC DEVICE

RELATED APPLICATIONS

This application claims priority to U.S. Provisional Application Ser. No. 63/328,757, filed Apr. 8, 2022, which is herein incorporated by reference.

BACKGROUND

Technical Field

The present disclosure relates to an imaging lens assembly and an electronic device. More particularly, the present disclosure relates to an imaging lens assembly which can be applied to portable electronic devices.

Description of Related Art

In recent years, because the rapid development of portable electronic devices, such as intelligent electronic devices, tablets, etc., are found throughout modern people's whole lives, the imaging lens assemblies applied to portable electronic devices have also flourished. However, with the continuous advancement of technology, users have more requirements for the quality of imaging lens assemblies.

SUMMARY

According to one aspect of the present disclosure, an imaging lens assembly includes a plurality of optical lens elements, a single-piece-formed light blocking sheet and a lens barrel. The single-piece-formed light blocking sheet corresponds to the plurality of optical lens elements. The lens barrel has a circular light-passing hole corresponding to the plurality of optical lens elements and the single-piece-formed light blocking sheet. The single-piece-formed light blocking sheet has a central aperture corresponding to the lens barrel and the plurality of optical lens elements, and a maximum aperture diameter is defined by the central aperture. The single-piece-formed light blocking sheet includes a plurality of light blocking structures surrounding and disposed adjacent to the central aperture, and a number of the plurality of light blocking structures is three to ten. A center of each of the light blocking structures is closer to a center of the central aperture than two ends of each of the light blocking structures, and the two ends of each of the light blocking structures extend toward the maximum aperture diameter of the central aperture. When a maximum aperture radius of the central aperture is Rmax, a minimum inner radius of the central aperture is defined near the center of each of the light blocking structures, the minimum inner radius is Rmin, and a roundness coefficient of the central aperture is tc, the following condition is satisfied: $0.41\% \leq tc \leq 10.2\%$, wherein $tc = ((Rmax-Rmin)/Rmax) \times 100\%$.

According to one aspect of the present disclosure, an electronic device includes the imaging lens assembly according to the aforementioned aspect and an image sensor disposed on an image surface of the imaging lens assembly.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
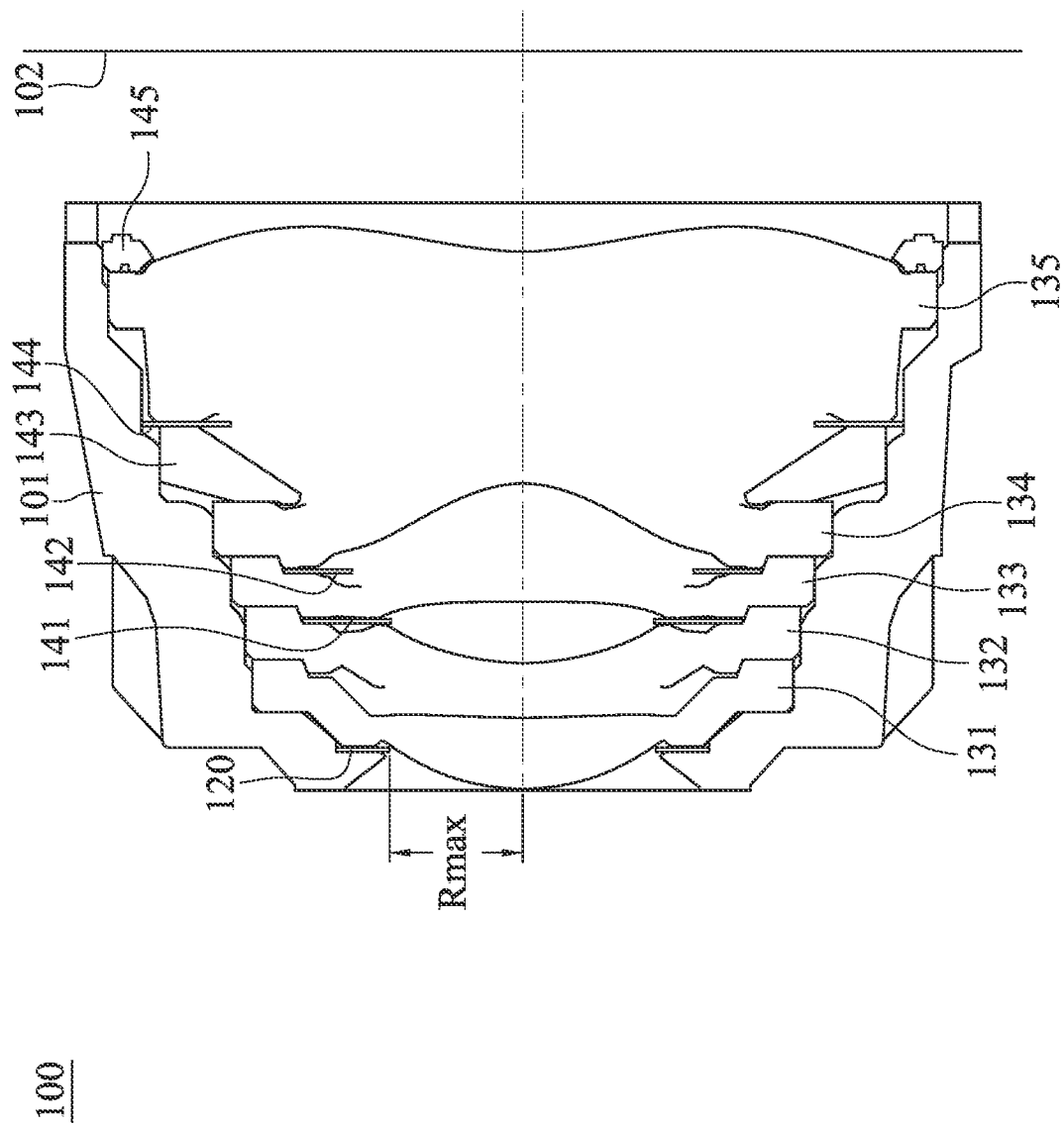
FIG. 1A is a schematic view of an imaging lens assembly according to the 1st embodiment of the present disclosure.

The present disclosure provides an imaging lens assembly including a plurality of optical lens elements, a single-piece-formed light blocking sheet and a lens barrel. The single-piece-formed light blocking sheet corresponds to the optical lens elements. The lens barrel has a circular light-passing hole corresponding to the optical lens elements and the single-piece-formed light blocking sheet. The single-piece-formed light blocking sheet has a central aperture corresponding to the lens barrel and the optical lens elements, and a maximum aperture diameter is defined by the central aperture. The single-piece-formed light blocking sheet includes a plurality of light blocking structures surrounding and disposed adjacent to the central aperture, and a number of the plurality of light blocking structures is three to ten. A center of each of the light blocking structures is closer to a center of the central aperture than two ends of each of the light blocking structures, and the two ends of each of the light blocking structures extend toward the maximum aperture diameter of the central aperture. When a maximum aperture radius of the central aperture is Rmax, a minimum inner radius of the central aperture is defined near the center of each of the light blocking structures, the minimum inner radius is Rmin, and a roundness coefficient of the central aperture is tc, the following condition is satisfied: 0.41%≤tc≤10.2%, wherein tc=((Rmax−Rmin)/Rmax)×100%. Since the single-piece-formed light blocking sheet can be an aperture stop of the imaging lens assembly, the maximum aperture diameter of the central aperture is equal to an entrance pupil diameter (EPD) of the imaging lens assembly. The single-piece-formed light blocking sheet can have effects similar to that of the multi-blade aperture stop of a single-lens reflex camera, so that the imaging performance of the physical light source can be effectively controlled by the light blocking structures so as to make the light source identifiable, and the size of the central aperture can be precisely controlled to achieve an ideal imaging effect. It should be noted that the roundness coefficient referred to in the present disclosure is not a roundness, and the roundness can be defined as t, wherein t=(Rmax−Rmin).

The single-piece-formed light blocking sheet can further include a plurality of radius structures, and the plurality of radius structures surround and are disposed adjacent to the central aperture. A number of the plurality of radius structures can be three to ten, each of the radius structures is connected to two of the light blocking structures adjacent thereto, and each of the radius structures can be arc-shaped. Therefore, the arc-shaped arrangement can prevent excessive light blocking and from affecting the specifications of the imaging lens assembly.

When a curvature radius of each of the radius structures is R, the following condition is satisfied: 0.25 mm<R<4.2 mm. By controlling the radius structures to maintain a particular quantity, more of the imaging light with a higher field of view can pass through.

When the maximum aperture radius of the central aperture is Rmax, and a curvature radius of each of the radius structures is R, the following condition is satisfied: R=Rmax. Therefore, the higher f-number of the imaging lens assembly can be maintained under the premise that the identifiability of the light source is maintained.

The plurality of radius structures and the plurality of light blocking structures are disposed alternately and surround the central aperture. Therefore, by the arrangement that the central aperture includes the radius structures, it is favorable for preventing the excessive length of the light blocking structures.

When a focal length of the imaging lens assembly is f, and the maximum aperture radius of the central aperture is Rmax, the following condition is satisfied: 0.9<F<3.25, wherein F=f/2Rmax. Therefore, within the ideal range of the roundness coefficient, it is favorable for collecting enough amount of the imaging light so as to maintain the imaging criteria at a high level.

Each of the light blocking structures is a straight-line segment, and each of the radius structures is arc-shaped. Therefore, the concentrated light beam of the strong light source will be reflected by the straight-line light blocking structures at the same time, and the arrangement of the arc-shaped radius structures can prevent excessive light blocking of the strong light source by the straight-line segment, so that the imaging light of the strong light source can pass through completely.

When the roundness coefficient of the central aperture is tc, the following condition is satisfied: 0.83%≤tc≤8.6%. Therefore, it is favorable for preventing excessive light blocking, so that the low-light photography will not be affected. Furthermore, the following condition can be satisfied: 0.83%≤tc≤6.8%. Therefore, it is favorable for preventing the imaging light of the weak light source from being affected, and it has better performance when shooting objects with the weak light source. Furthermore, the following condition can be satisfied: 0.68%≤tc≤4.1%. Therefore, the amount of incoming light can be increased to ensure better imaging performance for shooting in the night environment.

The number of the plurality of light blocking structures can be five to nine. Therefore, an appropriate number of the light blocking structures are conducive to maintaining a balance between a high amount of incident light and high quality.

When a thickness of the single-piece-formed light blocking sheet is S, the following condition is satisfied: 5 μm<S<210 μm. Therefore, within the specific thickness range, it is not easy to generate additional non-ideal light under the premise of a strict real-shot situation.

The present disclosure provides an electronic device. The electronic device includes the imaging lens assembly according to the aforementioned aspect and an image sensor disposed on an image surface of the imaging lens assembly.

According to the above description of the present disclosure, the following specific embodiment and examples are provided for further explanation.

1st Embodiment

Figure 1B:
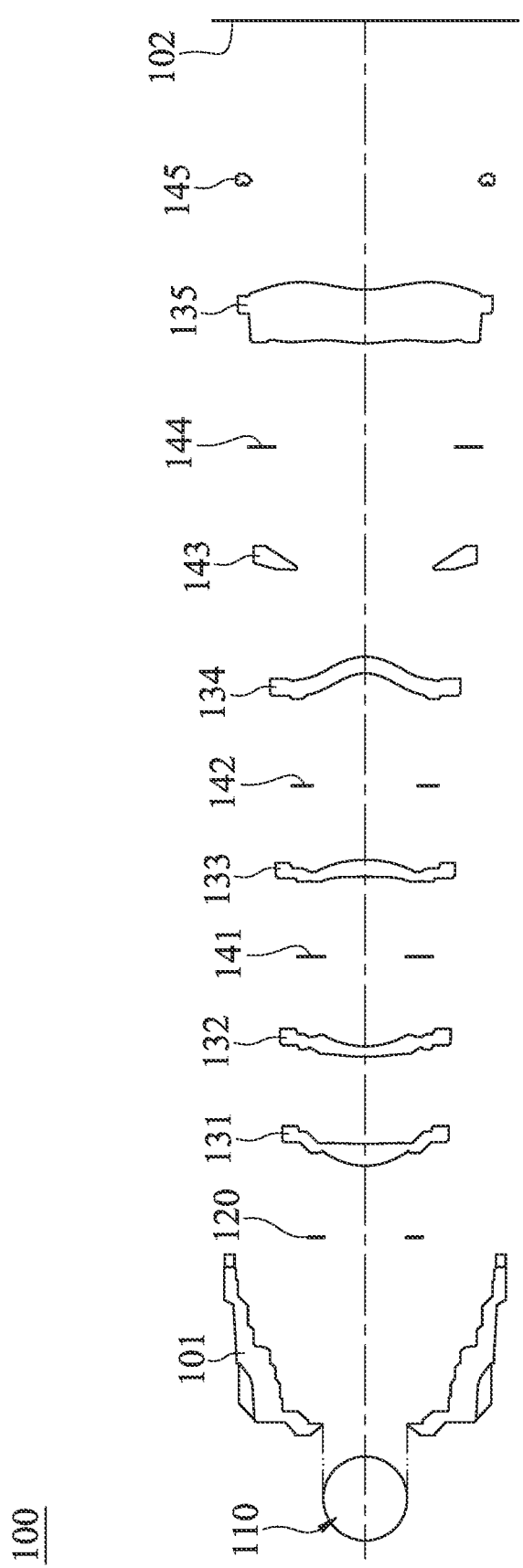
FIG. 1B is an exploded view of the imaging lens assembly of FIG. 1A.

FIG. 1A is a schematic view of an imaging lens assembly 100 according to the 1st embodiment of the present disclosure. FIG. 1B is an exploded view of the imaging lens assembly 100 of FIG. 1A. As shown in FIG. 1A and FIG. 1B, the imaging lens assembly 100 includes a plurality of optical lens elements (reference number is omitted), a single-piece-formed light blocking sheet 120, and a lens barrel 101. The plurality of optical lens elements and the single-piece-formed light blocking sheet 120 are accommodated in the lens barrel 101. The lens barrel 101 has a circular light-passing hole 110 corresponding to the optical lens elements and the single-piece-formed light blocking sheet 120. The single-piece-formed light blocking sheet 120 corresponds to the optical lens elements, and an image surface 102 is located on the most image side of the lens barrel 101.

In detail, in the 1st embodiment of FIG. 1A, a number of the optical lens elements is five, and the five optical lens elements are, in order from an object side to an image side of the imaging lens assembly 100, a first optical lens element 131, a second optical lens element 132, a third optical lens element 133, a fourth optical lens element 134, and a fifth optical lens element 135. The single-piece-formed light blocking sheet 120 is a light blocking sheet disposed between the lens barrel 101 and the first optical lens element 131 in the imaging lens assembly 100. Further, the imaging lens assembly 100 of the present disclosure can further include other optical elements, such as light blocking sheets, spacers, retainers, etc. In detail, the imaging lens assembly 100 according to the 1st embodiment of FIG. 1A can further include three light blocking sheets 141, 142, 144, a spacer 143, and a retainer 145. It should be noted that the position of the single-piece-formed light blocking sheet and the arrangement of the light blocking sheet, the spacer and the retainer can be adjusted corresponding to the actual needs, and the present disclosure is not limited thereto.

Figure 2A:
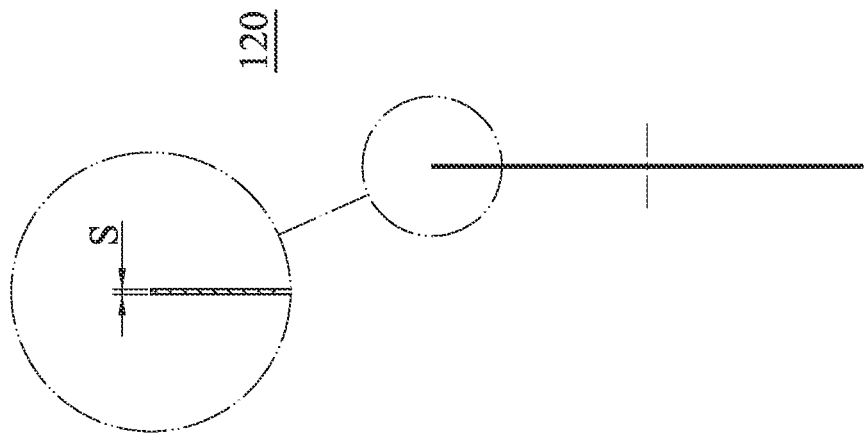
FIG. 2A is a cross-sectional view of a single-piece-formed light blocking sheet of the imaging lens assembly according to the 1st example of the 1st embodiment of FIG. 1A.
Figure 2B:
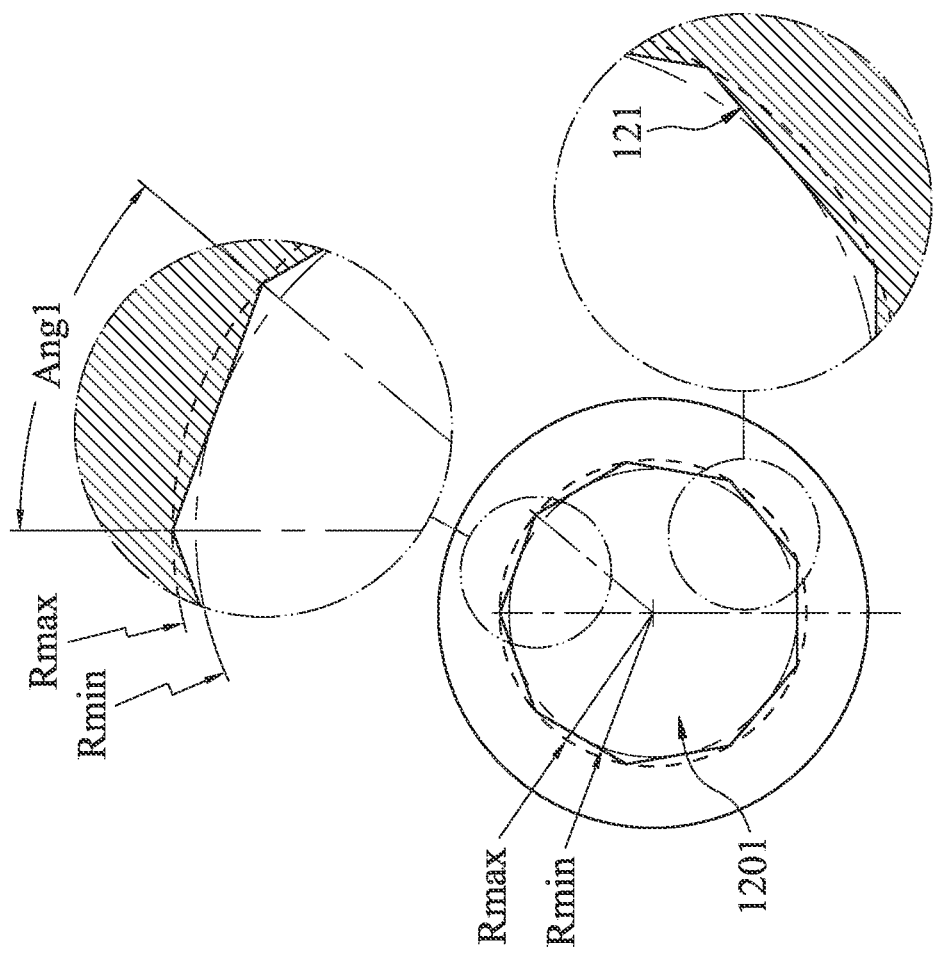
FIG. 2B is a schematic view of the single-piece-formed light blocking sheet of FIG. 2A.

FIG. 2A is a cross-sectional view of a single-piece-formed light blocking sheet 120 of the imaging lens assembly 100 according to the 1st example of the 1st embodiment of FIG. 1A. FIG. 2B is a schematic view of the single-piece-formed light blocking sheet 120 of FIG. 2A. As shown in FIG. 2A and FIG. 2B, the single-piece-formed light blocking sheet 120 has a central aperture 1201 corresponding to the lens barrel 101 and the optical lens elements. A maximum aperture diameter is defined by the central aperture 1201, and a minimum inner radius of the central aperture 1201 is defined near a center of each of a plurality of light blocking structures 121. The single-piece-formed light blocking sheet 120 includes the plurality of light blocking structures 121 surrounding and disposed adjacent to the central aperture 1201. The center of each of the light blocking structures 121 is closer to a center of the central aperture 1201 than two ends of each of the light blocking structures 121, and the two ends of each of the light blocking structures 121 extend toward the maximum aperture diameter of the central aperture 1201. In FIG. 2B, a number of the light blocking structures 121 is nine, and when an angle between the connecting lines from the center of the central aperture 1201 to the two ends of each of the light blocking structures 121 is Ang1, Ang1 is 40 degrees, but the present disclosure is not limited thereto.

In the 1st example of the 1st embodiment, when a maximum aperture radius of the central aperture 1201 is Rmax, the minimum inner radius of the central aperture 1201 is Rmin, a roundness coefficient of the central aperture 1201 is tc, a thickness of the single-piece-formed light blocking sheet 120 is S, and a focal length of the imaging lens assembly 100 is f, wherein t=Rmax−Rmin, tc=((Rmax−Rmin)/Rmax)×100%=t/Rmax×100%, and F=f/2Rmax, the parameters satisfy the conditions shown in Table 1A.

TABLE 1A

| Rmax (mm) | 0.935 | S (μm) | 16 |
|---|---|---|---|
| Rmin (mm) | 0.8786 | f (mm) | 4.16 |
| t | 0.0564 | F | 2.225 |
| tc (%) | 6.03 | | |

Figure 3A:
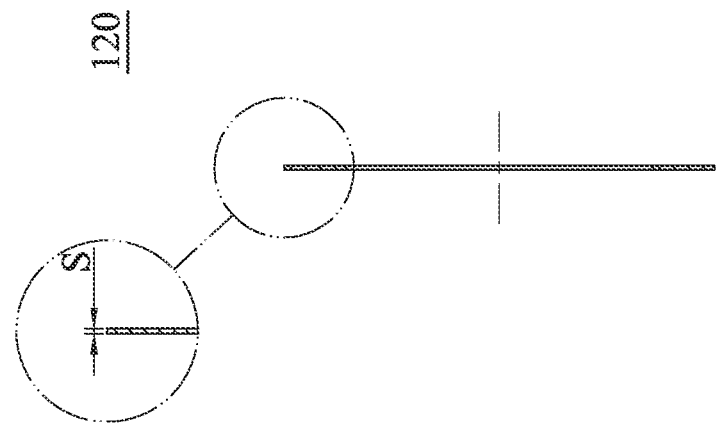
FIG. 3A is a cross-sectional view of a single-piece-formed light blocking sheet of the imaging lens assembly according to the 2nd example of the 1st embodiment of FIG. 1A.
Figure 3B:
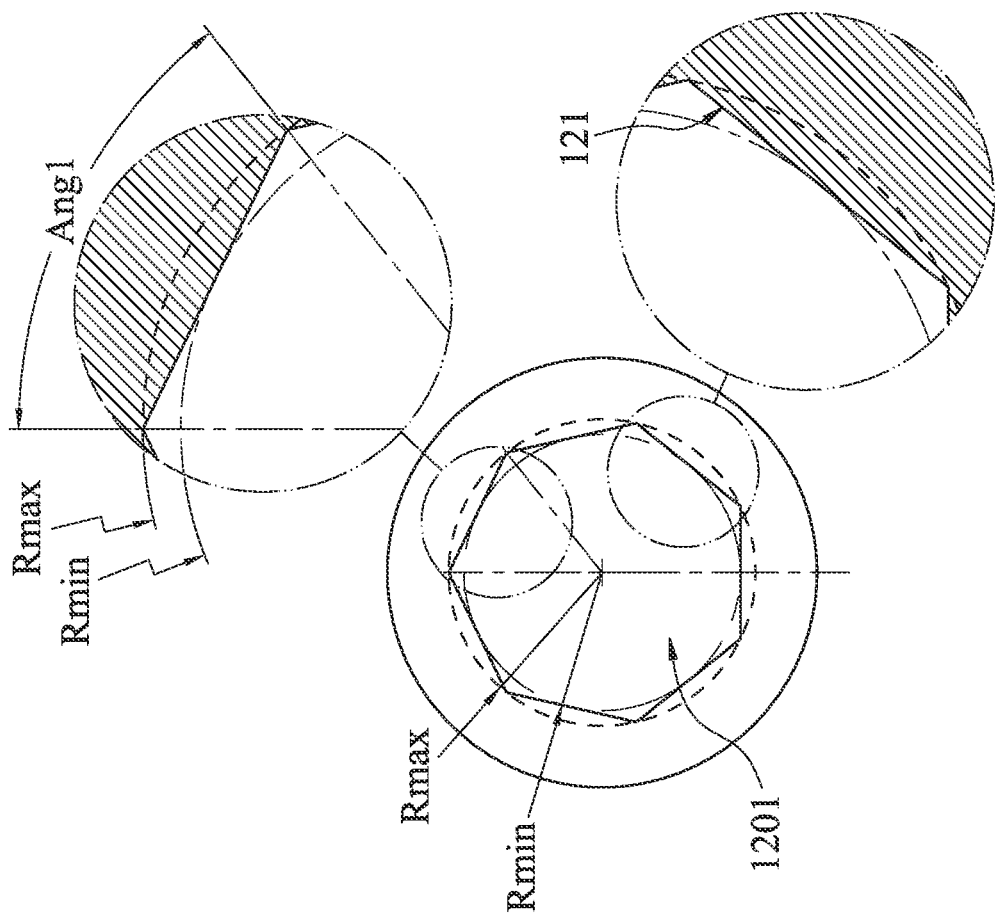
FIG. 3B is a schematic view of the single-piece-formed light blocking sheet of FIG. 3A.

FIG. 3A is a cross-sectional view of a single-piece-formed light blocking sheet 120 of the imaging lens assembly 100 according to the 2nd example of the 1st embodiment of FIG. 1A. FIG. 3B is a schematic view of the single-piece-formed light blocking sheet 120 of FIG. 3A. As shown in FIG. 3A and FIG. 3B, the single-piece-formed light blocking sheet 120 has a central aperture 1201 corresponding to the lens barrel 101 and the optical lens elements. A maximum aperture diameter is defined by the central aperture 1201, and a minimum inner radius of the central aperture 1201 is defined near a center of each of a plurality of light blocking structures 121. The single-piece-formed light blocking sheet 120 includes the plurality of light blocking structures 121 surrounding and disposed adjacent to the central aperture 1201. The center of each of the light blocking structures 121 is closer to a center of the central aperture 1201 than two ends of each of the light blocking structures 121, and the two ends of each of the light blocking structures 121 extend toward the maximum aperture diameter of the central aperture 1201. In FIG. 3B, a number of the light blocking structures 121 is seven, and when an angle between the connecting lines from the center of the central aperture 1201 to the two ends of each of the light blocking structures 121 is Ang1, Ang1 is 51.429 degrees, but the present disclosure is not limited thereto.

In the 2nd example of the 1st embodiment, when a maximum aperture radius of the central aperture 1201 is Rmax, the minimum inner radius of the central aperture 1201 is Rmin, a roundness coefficient of the central aperture 1201 is tc, a thickness of the single-piece-formed light blocking sheet 120 is S, and a focal length of the imaging lens assembly 100 is f, wherein t=Rmax−Rmin, tc=((Rmax−Rmin)/Rmax)×100%=t/Rmax×100%, and F=f/2Rmax, the parameters satisfy the conditions shown in Table 1B.

TABLE 1B

| Rmax (mm) | 0.935 | S (μm) | 23 |
|---|---|---|---|
| Rmin (mm) | 0.8424 | f (mm) | 4.16 |
| t | 0.0926 | F | 2.225 |
| tc (%) | 9.90 | | |

Figure 4A:
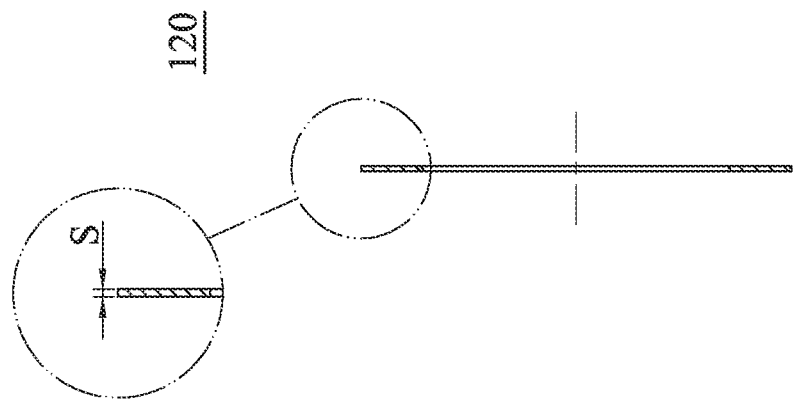
FIG. 4A is a cross-sectional view of a single-piece-formed light blocking sheet of the imaging lens assembly according to the 3rd example of the 1st embodiment of FIG. 1A.
Figure 4B:
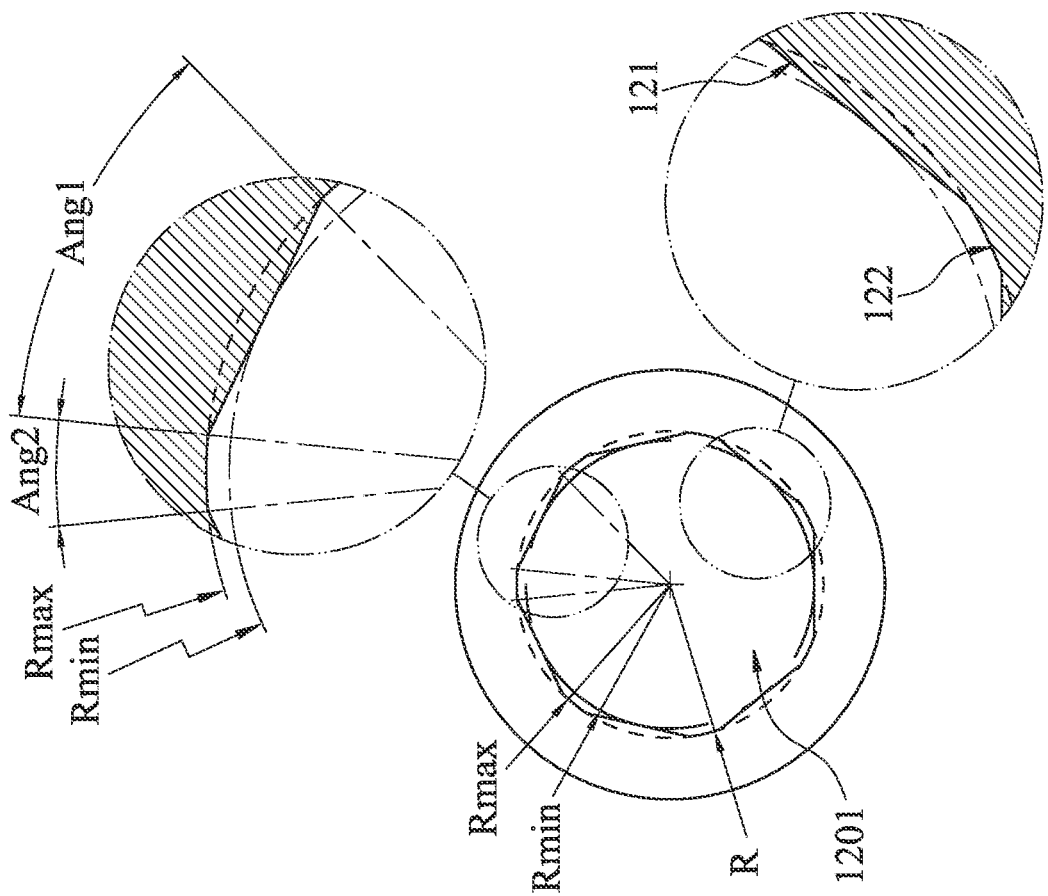
FIG. 4B is a schematic view of the single-piece-formed light blocking sheet of FIG. 4A.

FIG. 4A is a cross-sectional view of a single-piece-formed light blocking sheet 120 of the imaging lens assembly 100 according to the 3rd example of the 1st embodiment of FIG. 1A. FIG. 4B is a schematic view of the single-piece-formed light blocking sheet 120 of FIG. 4A. As shown in FIG. 4A and FIG. 4B, the single-piece-formed light blocking sheet 120 has a central aperture 1201 corresponding to the lens barrel 101 and the optical lens elements. A maximum aperture diameter is defined by the central aperture 1201, and a minimum inner radius of the central aperture 1201 is defined near a center of each of a plurality of light blocking structures 121. The single-piece-formed light blocking sheet 120 includes the plurality of light blocking structures 121 and a plurality of radius structures 122. The light blocking structures 121 and the radius structures 122 surround and are disposed adjacent to the central aperture 1201, and the light blocking structures 121 and the radius structures 122 are disposed alternately and surround the central aperture 1201. The center of each of the light blocking structures 121 is closer to a center of the central aperture 1201 than two ends of each of the light blocking structures 121, the two ends of each of the light blocking structures 121 extend toward the maximum aperture diameter of the central aperture 1201, and each of the radius structures 122 is connected to two of the light blocking structures 121 adjacent thereto. In FIG. 4B, a number of the light blocking structures 121 is seven, and each of the light blocking structures 121 is a straight-line segment. A number of the radius structures 122 is seven, and each of the radius structures 122 is arc-shaped. When an angle between the connecting lines from the center of the central aperture 1201 to the two ends of each of the light blocking structures 121 is Ang1, Ang1 is 40.002 degrees, but the present disclosure is not limited thereto. When an angle between the connecting lines from the center of the central aperture 1201 to the two ends of each of the radius structures 122 is Ang2, Ang2 is 11.426 degrees, but the present disclosure is not limited thereto.

In the 3rd example of the 1st embodiment, when a maximum aperture radius of the central aperture 1201 is Rmax, the minimum inner radius of the central aperture 1201 is Rmin, a roundness coefficient of the central aperture 1201 is tc, a thickness of the single-piece-formed light blocking sheet 120 is S, a focal length of the imaging lens assembly 100 is f, and a curvature radius of each of the radius structures 122 is R, wherein t=Rmax−Rmin, tc=((Rmax−Rmin)/Rmax)×100%=t/Rmax×100%, and F=f/2Rmax, the parameters satisfy the conditions shown in Table 1C.

TABLE 1C

| Rmax (mm) | 0.935 | S (μm) | 31 |
|---|---|---|---|
| Rmin (mm) | 0.8786 | f (mm) | 4.16 |
| t | 0.0564 | F | 2.225 |
| tc (%) | 6.03 | R (mm) | 0.935 |

Figure 5A:
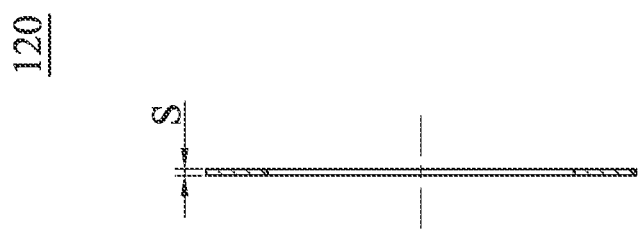
FIG. 5A is a cross-sectional view of a single-piece-formed light blocking sheet of the imaging lens assembly according to the 4th example of the 1st embodiment of FIG. 1A.
Figure 5B:
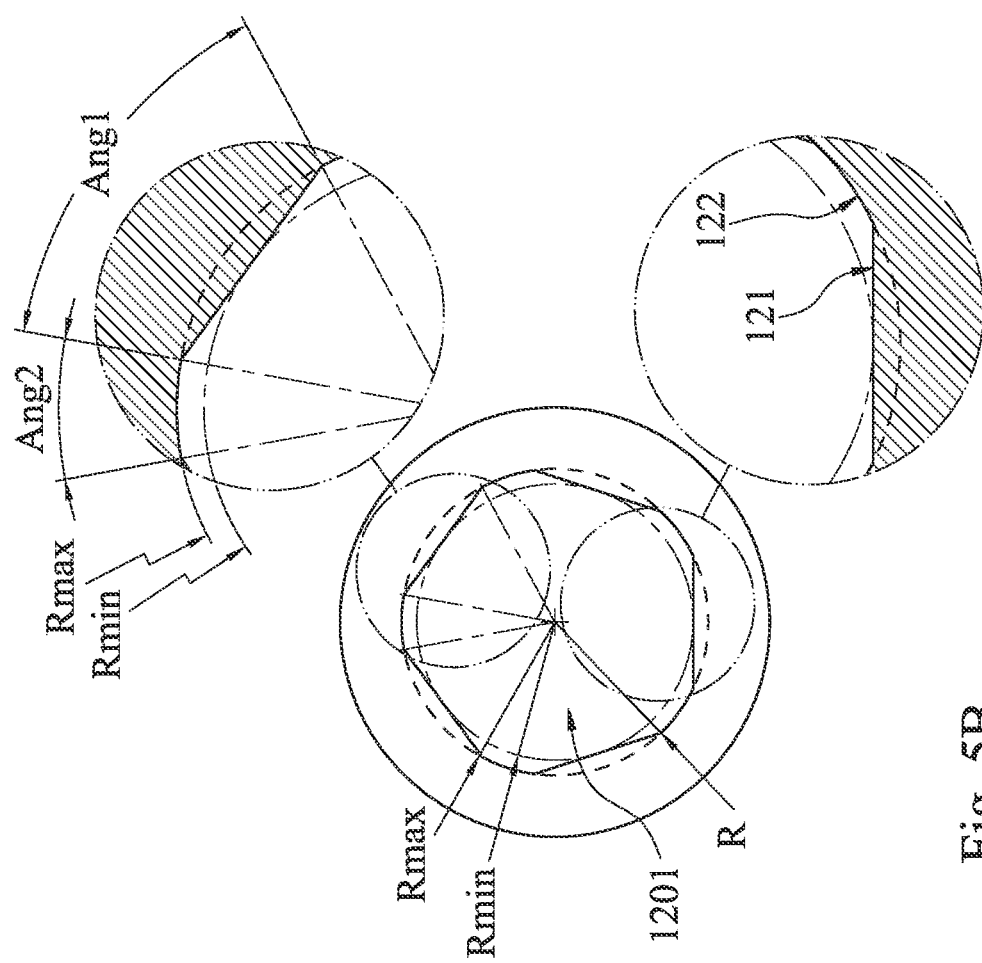
FIG. 5B is a schematic view of the single-piece-formed light blocking sheet of FIG. 5A.

FIG. 5A is a cross-sectional view of a single-piece-formed light blocking sheet 120 of the imaging lens assembly 100 according to the 4th example of the 1st embodiment of FIG. 1A. FIG. 5B is a schematic view of the single-piece-formed light blocking sheet 120 of FIG. 5A. As shown in FIG. 5A and FIG. 5B, the single-piece-formed light blocking sheet 120 has a central aperture 1201 corresponding to the lens barrel 101 and the optical lens elements. A maximum aperture diameter is defined by the central aperture 1201, and a minimum inner radius of the central aperture 1201 is defined near a center of each of a plurality of light blocking structures 121. The single-piece-formed light blocking sheet 120 includes the plurality of light blocking structures 121 and a plurality of radius structures 122. The light blocking structures 121 and the radius structures 122 surround and are disposed adjacent to the central aperture 1201, and the light blocking structures 121 and the radius structures 122 are disposed alternately and surround the central aperture 1201. The center of each of the light blocking structures 121 is closer to a center of the central aperture 1201 than two ends of each of the light blocking structures 121, the two ends of each of the light blocking structures 121 extend toward the maximum aperture diameter of the central aperture 1201, and each of the radius structures 122 is connected to two of the light blocking structures 121 adjacent thereto. In FIG. 5B, a number of the light blocking structures 121 is five, and each of the light blocking structures 121 is a straight-line segment. A number of the radius structures 122 is five, and each of the radius structures 122 is arc-shaped. When an angle between the connecting lines from the center of the central aperture 1201 to the two ends of each of the light blocking structures 121 is Ang1, Ang1 is 51.43 degrees, but the present disclosure is not limited thereto. When an angle between the connecting lines from the center of the central aperture 1201 to the two ends of each of the radius structures 122 is Ang2, Ang2 is 20.57 degrees, but the present disclosure is not limited thereto.

In the 4th example of the 1st embodiment, when a maximum aperture radius of the central aperture 1201 is Rmax, the minimum inner radius of the central aperture 1201 is Rmin, a roundness coefficient of the central aperture 1201 is tc, a thickness of the single-piece-formed light blocking sheet 120 is S, a focal length of the imaging lens assembly 100 is f, and a curvature radius of each of the radius structures 122 is R, wherein t=Rmax−Rmin, tc=((Rmax−Rmin)/Rmax)×100%=t/Rmax×100%, and F=f/2Rmax, the parameters satisfy the conditions shown in Table 1D.

TABLE 1D

| Rmax (mm) | 0.935 | S (μm) | 41 |
|---|---|---|---|
| Rmin (mm) | 0.8424 | f (mm) | 4.16 |
| t | 0.0926 | F | 2.225 |
| tc (%) | 9.90 | R (mm) | 0.935 |

Figure 6A:
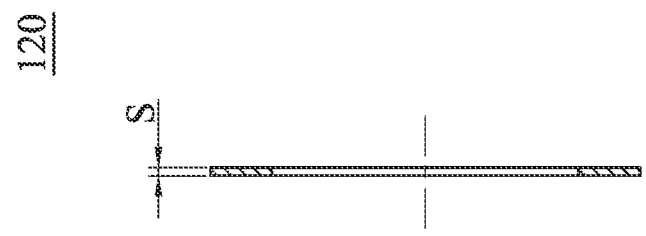
FIG. 6A is a cross-sectional view of a single-piece-formed light blocking sheet of the imaging lens assembly according to the 5th example of the 1st embodiment of FIG. 1A.
Figure 6B:
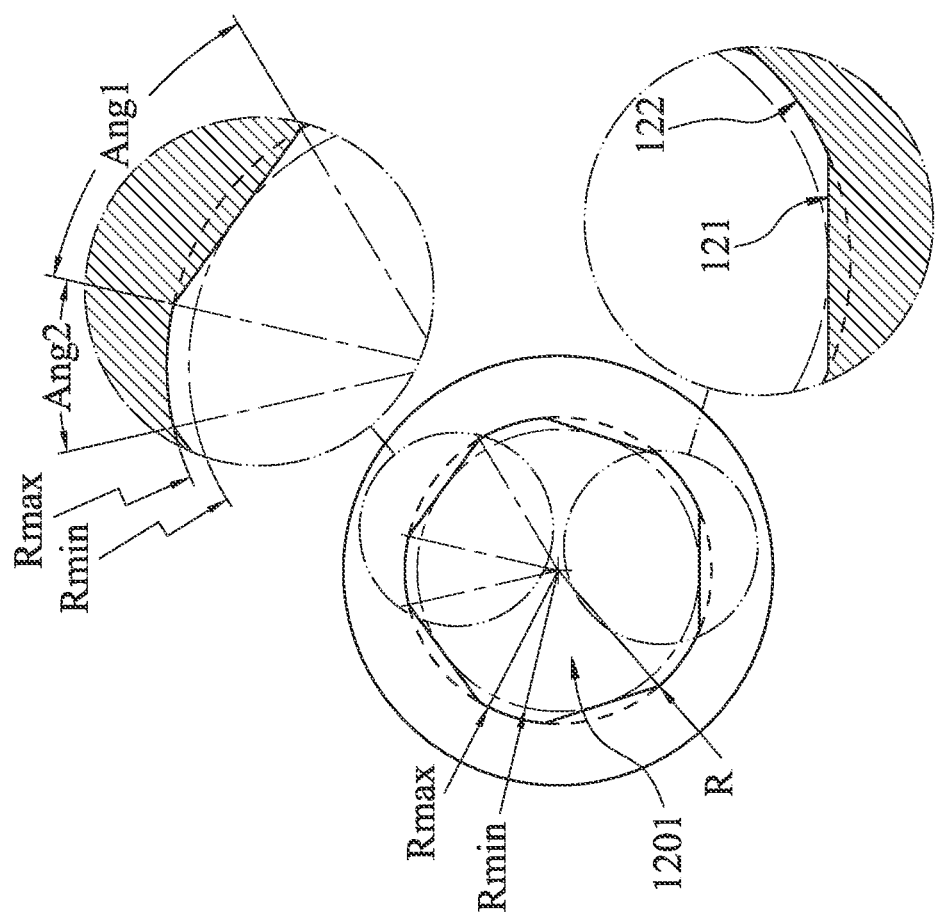
FIG. 6B is a schematic view of the single-piece-formed light blocking sheet of FIG. 6A.

FIG. 6A is a cross-sectional view of a single-piece-formed light blocking sheet 120 of the imaging lens assembly 100 according to the 5th example of the 1st embodiment of FIG. 1A. FIG. 6B is a schematic view of the single-piece-formed light blocking sheet 120 of FIG. 6A. As shown in FIG. 6A and FIG. 6B, the single-piece-formed light blocking sheet 120 has a central aperture 1201 corresponding to the lens barrel 101 and the optical lens elements. A maximum aperture diameter is defined by the central aperture 1201, and a minimum inner radius of the central aperture 1201 is defined near a center of each of a plurality of light blocking structures 121. The single-piece-formed light blocking sheet 120 includes the plurality of light blocking structures 121 and a plurality of radius structures 122. The light blocking structures 121 and the radius structures 122 surround and are disposed adjacent to the central aperture 1201, and the light blocking structures 121 and the radius structures 122 are disposed alternately and surround the central aperture 1201. The center of each of the light blocking structures 121 is closer to a center of the central aperture 1201 than two ends of each of the light blocking structures 121, the two ends of each of the light blocking structures 121 extend toward the maximum aperture diameter of the central aperture 1201, and each of the radius structures 122 is connected to two of the light blocking structures 121 adjacent thereto. In FIG. 6B, a number of the light blocking structures 121 is five, and each of the light blocking structures 121 is a straight-line segment. A number of the radius structures 122 is five, and each of the radius structures 122 is arc-shaped. When an angle between the connecting lines from the center of the central aperture 1201 to the two ends of each of the light blocking structures 121 is Ang1, Ang1 is 46.21 degrees, but the present disclosure is not limited thereto. When an angle between the connecting lines from the center of the central aperture 1201 to the two ends of each of the radius structures 122 is Ang2, Ang2 is 25.79 degrees, but the present disclosure is not limited thereto.

In the 5th example of the 1st embodiment, when a maximum aperture radius of the central aperture 1201 is Rmax, the minimum inner radius of the central aperture 1201 is Rmin, a roundness coefficient of the central aperture 1201 is tc, a thickness of the single-piece-formed light blocking sheet 120 is S, a focal length of the imaging lens assembly 100 is f, and a curvature radius of each of the radius structures 122 is R, wherein t=Rmax−Rmin, tc=((Rmax−Rmin)/Rmax)×100%=t/Rmax×100%, and F=f/2Rmax, the parameters satisfy the conditions shown in Table 1E.

TABLE 1E

| Rmax (mm) | 0.935 | S (μm) | 50 |
|---|---|---|---|
| Rmin (mm) | 0.86 | f (mm) | 4.16 |
| t | 0.075 | F | 2.225 |
| tc (%) | 8.02 | R (mm) | 0.935 |

Figure 7A:
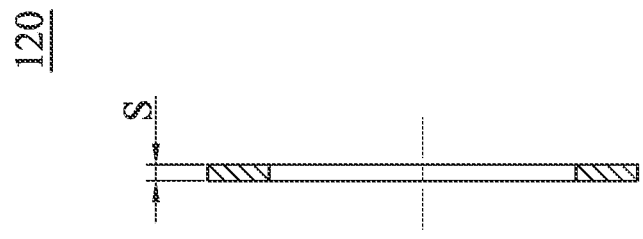
FIG. 7A is a cross-sectional view of a single-piece-formed light blocking sheet of the imaging lens assembly according to the 6th example of the 1st embodiment of FIG. 1A.
Figure 7B:
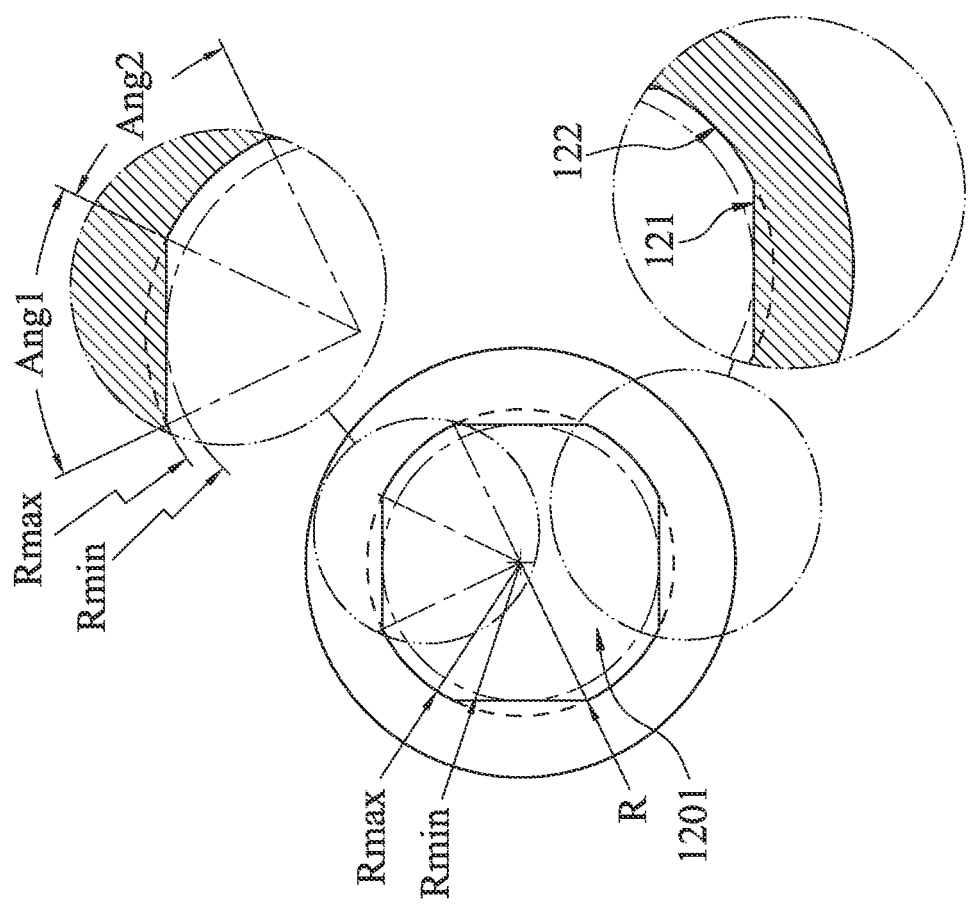
FIG. 7B is a schematic view of the single-piece-formed light blocking sheet of FIG. 7A.

FIG. 7A is a cross-sectional view of a single-piece-formed light blocking sheet 120 of the imaging lens assembly 100 according to the 6th example of the 1st embodiment of FIG. 1A. FIG. 7B is a schematic view of the single-piece-formed light blocking sheet 120 of FIG. 7A. As shown in FIG. 7A and FIG. 7B, the single-piece-formed light blocking sheet 120 has a central aperture 1201 corresponding to the lens barrel 101 and the optical lens elements. A maximum aperture diameter is defined by the central aperture 1201, and a minimum inner radius of the central aperture 1201 is defined near a center of each of a plurality of light blocking structures 121. The single-piece-formed light blocking sheet 120 includes the plurality of light blocking structures 121 and a plurality of radius structures 122. The light blocking structures 121 and the radius structures 122 surround and are disposed adjacent to the central aperture 1201, and the light blocking structures 121 and the radius structures 122 are disposed alternately and surround the central aperture 1201. The center of each of the light blocking structures 121 is closer to a center of the central aperture 1201 than two ends of each of the light blocking structures 121, the two ends of each of the light blocking structures 121 extend toward the maximum aperture diameter of the central aperture 1201, and each of the radius structures 122 is connected to two of the light blocking structures 121 adjacent thereto. In FIG. 7B, a number of the light blocking structures 121 is four, and each of the light blocking structures 121 is a straight-line segment. A number of the radius structures 122 is four, and each of the radius structures 122 is arc-shaped. When an angle between the connecting lines from the center of the central aperture 1201 to the two ends of each of the light blocking structures 121 is Ang1, Ang1 is 51.43 degrees, but the present disclosure is not limited thereto. When an angle between the connecting lines from the center of the central aperture 1201 to the two ends of each of the radius structures 122 is Ang2, Ang2 is 38.57 degrees, but the present disclosure is not limited thereto.

In the 6th example of the 1st embodiment, when a maximum aperture radius of the central aperture 1201 is Rmax, the minimum inner radius of the central aperture 1201 is Rmin, a roundness coefficient of the central aperture 1201 is tc, a thickness of the single-piece-formed light blocking sheet 120 is S, a focal length of the imaging lens assembly 100 is f, and a curvature radius of each of the radius structures 122 is R, wherein t=Rmax−Rmin, tc=((Rmax−Rmin)/Rmax)×100%=t/Rmax×100%, and F=f/2Rmax, the parameters satisfy the conditions shown in Table 1F.

TABLE 1F

| Rmax (mm) | 0.935 | S (μm) | 100 |
|---|---|---|---|
| Rmin (mm) | 0.8424 | f (mm) | 4.16 |
| t | 0.0926 | F | 2.225 |
| tc (%) | 9.90 | R (mm) | 0.935 |

Figure 8A:
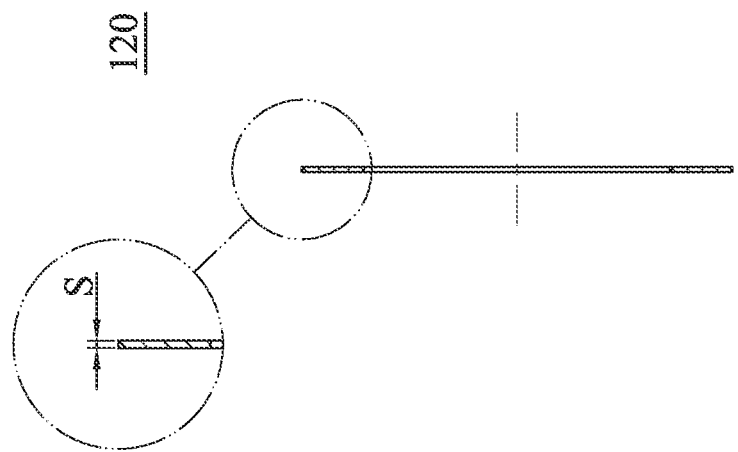
FIG. 8A is a cross-sectional view of a single-piece-formed light blocking sheet of the imaging lens assembly according to the 7th example of the 1st embodiment of FIG. 1A.
Figure 8B:
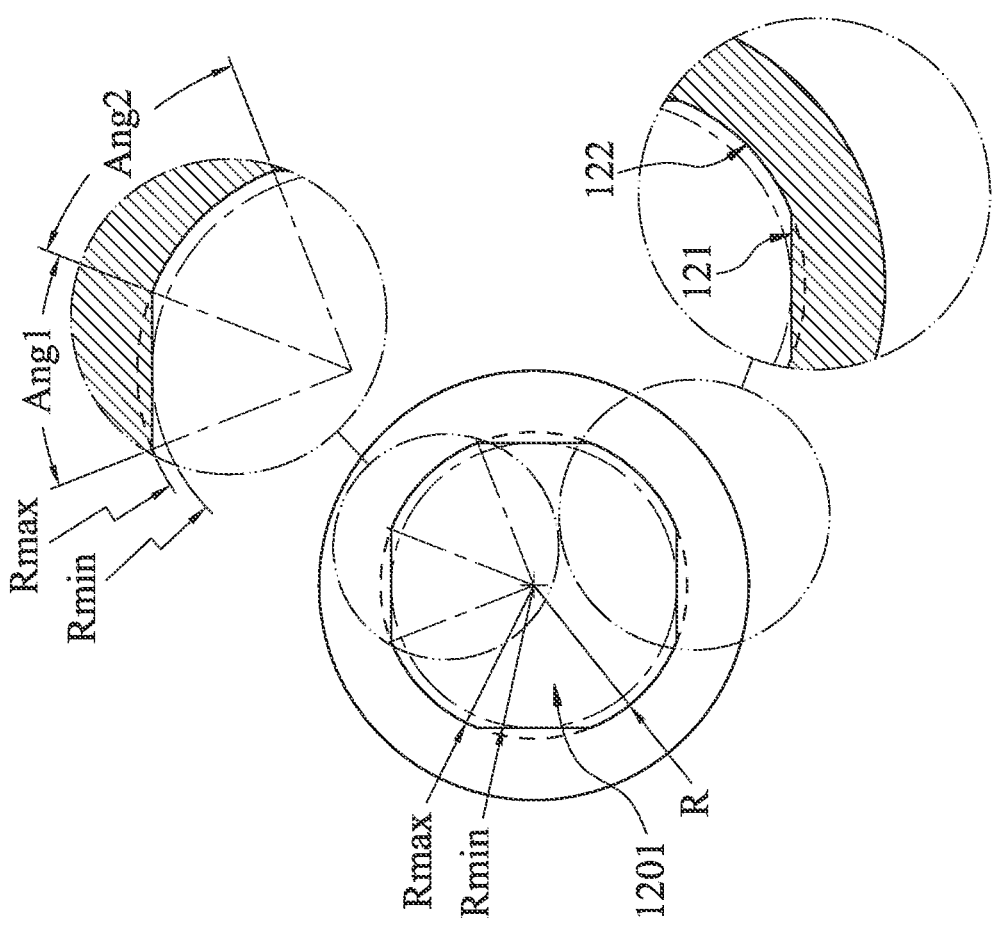
FIG. 8B is a schematic view of the single-piece-formed light blocking sheet of FIG. 8A.

FIG. 8A is a cross-sectional view of a single-piece-formed light blocking sheet 120 of the imaging lens assembly 100 according to the 7th example of the 1st embodiment of FIG. 1A. FIG. 8B is a schematic view of the single-piece-formed light blocking sheet 120 of FIG. 8A. As shown in FIG. 8A and FIG. 8B, the single-piece-formed light blocking sheet 120 has a central aperture 1201 corresponding to the lens barrel 101 and the optical lens elements. A maximum aperture diameter is defined by the central aperture 1201, and a minimum inner radius of the central aperture 1201 is defined near a center of each of a plurality of light blocking structures 121. The single-piece-formed light blocking sheet 120 includes the plurality of light blocking structures 121 and a plurality of radius structures 122. The light blocking structures 121 and the radius structures 122 surround and are disposed adjacent to the central aperture 1201, and the light blocking structures 121 and the radius structures 122 are disposed alternately and surround the central aperture 1201. The center of each of the light blocking structures 121 is closer to a center of the central aperture 1201 than two ends of each of the light blocking structures 121, the two ends of each of the light blocking structures 121 extend toward the maximum aperture diameter of the central aperture 1201, and each of the radius structures 122 is connected to two of the light blocking structures 121 adjacent thereto. In FIG. 8B, a number of the light blocking structures 121 is four, and each of the light blocking structures 121 is a straight-line segment. A number of the radius structures 122 is four, and each of the radius structures 122 is arc-shaped. When an angle between the connecting lines from the center of the central aperture 1201 to the two ends of each of the light blocking structures 121 is Ang1, Ang1 is 42.965 degrees, but the present disclosure is not limited thereto. When an angle between the connecting lines from the center of the central aperture 1201 to the two ends of each of the radius structures 122 is Ang2, Ang2 is 47.035 degrees, but the present disclosure is not limited thereto.

In the 7th example of the 1st embodiment, when a maximum aperture radius of the central aperture 1201 is Rmax, the minimum inner radius of the central aperture 1201 is Rmin, a roundness coefficient of the central aperture 1201 is tc, a thickness of the single-piece-formed light blocking sheet 120 is S, a focal length of the imaging lens assembly 100 is f, and a curvature radius of each of the radius structures 122 is R, wherein t=Rmax−Rmin, tc=((Rmax−Rmin)/Rmax)×100%=t/Rmax×100%, and F=f/2Rmax, the parameters satisfy the conditions shown in Table 1G.

TABLE 1G

| Rmax (mm) | 0.935 | S (μm) | 31 |
|---|---|---|---|
| Rmin (mm) | 0.87 | f (mm) | 4.16 |
| t | 0.065 | F | 2.225 |
| tc (%) | 6.95 | R (mm) | 0.935 |

2nd Embodiment

Figure 9A:
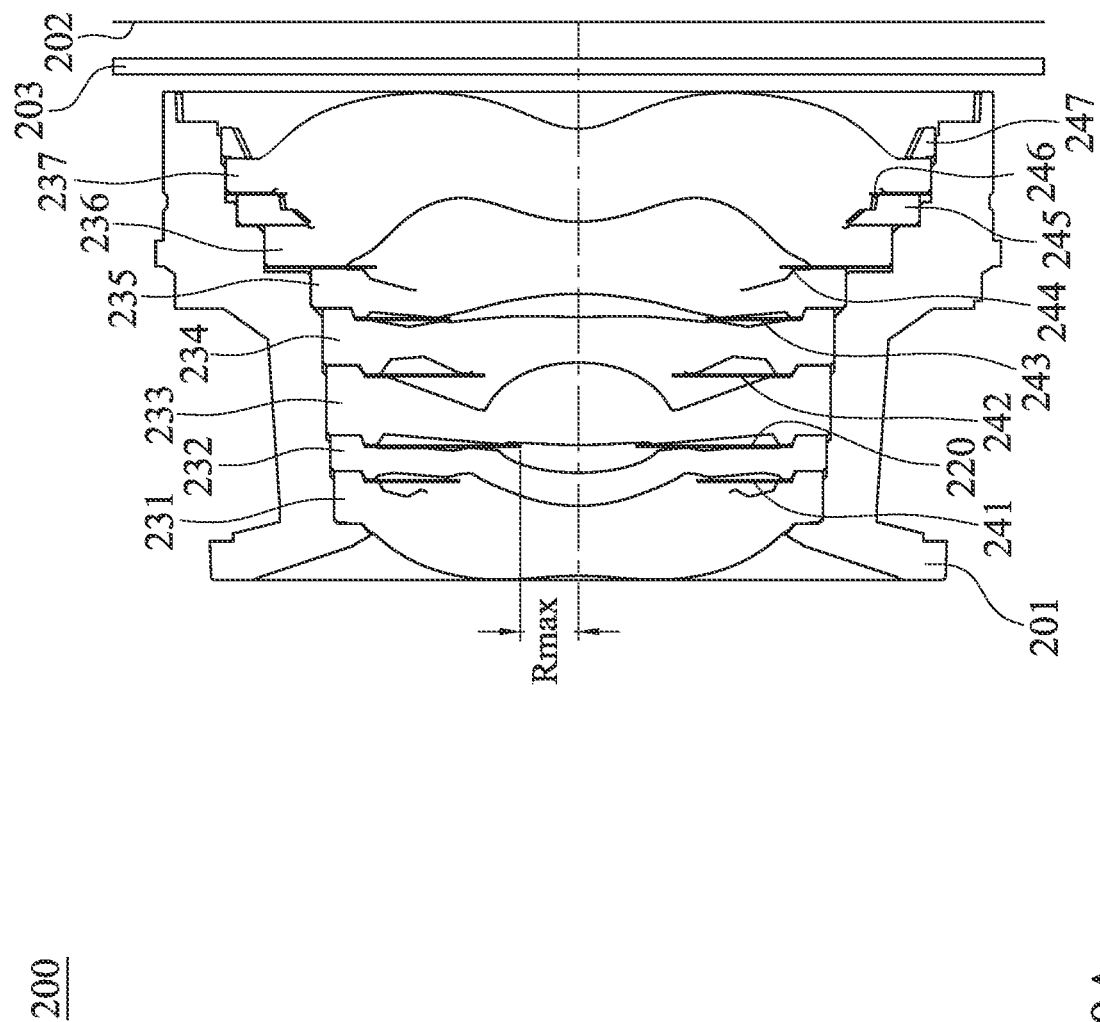
FIG. 9A is a schematic view of an imaging lens assembly according to the 2nd embodiment of the present disclosure.
Figure 9B:
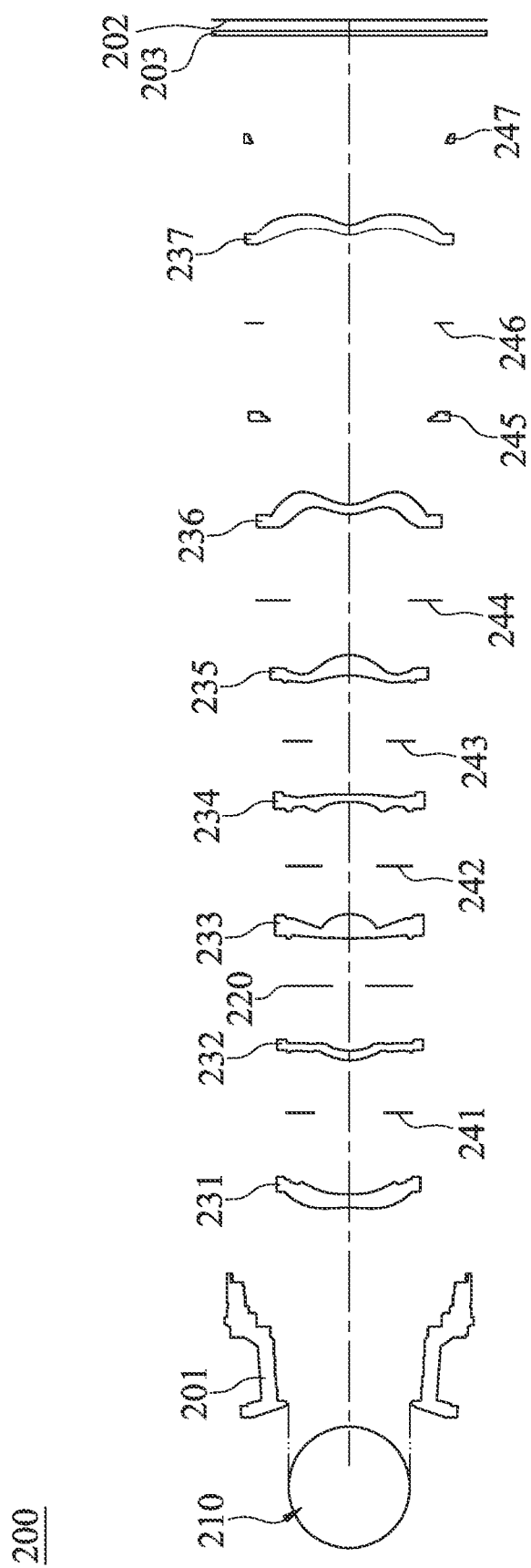
FIG. 9B is an exploded view of the imaging lens assembly of FIG. 9A.

FIG. 9A is a schematic view of an imaging lens assembly 200 according to the 2nd embodiment of the present disclosure. FIG. 9B is an exploded view of the imaging lens assembly 200 of FIG. 9A. As shown in FIG. 9A and FIG. 9B, the imaging lens assembly 200 includes a plurality of optical lens elements (reference number is omitted), a single-piece-formed light blocking sheet 220, and a lens barrel 201. The plurality of optical lens elements and the single-piece-formed light blocking sheet 220 are accommodated in the lens barrel 201. The lens barrel 201 has a circular light-passing hole 210 corresponding to the optical lens elements and the single-piece-formed light blocking sheet 220. The single-piece-formed light blocking sheet 220 corresponds to the optical lens elements, and an image surface 202 is located on the most image side of the lens barrel 201.

In the 2nd embodiment of FIG. 9A, a number of the optical lens elements is seven, and the seven optical lens elements are, in order from an object side to an image side of the imaging lens assembly 200, a first optical lens element 231, a second optical lens element 232, a third optical lens element 233, a fourth optical lens element 234, a fifth optical lens element 235, a sixth optical lens element 236, and a seventh optical lens element 237. The single-piece-formed light blocking sheet 220 is a light blocking sheet disposed between the second optical lens element 232 and the third optical lens element 233 in the imaging lens assembly 200. Further, the imaging lens assembly 200 of the present disclosure can further include other optical elements, such as light blocking sheets, spacers, retainers, etc. In detail, the imaging lens assembly 200 according to the 2nd embodiment of FIG. 9A can further include five light blocking sheets 241, 242, 243, 244, 246, a spacer 245, and a retainer 247. It should be noted that the position of the single-piece-formed light blocking sheet and the arrangement of the light blocking sheet, the spacer and the retainer can be adjusted corresponding to the actual needs, and the present disclosure is not limited thereto. Furthermore, the imaging lens assembly 200 can further include a filter 203, wherein the filter 203 is disposed between the lens barrel 201 and the image surface 202.

Figure 10A:
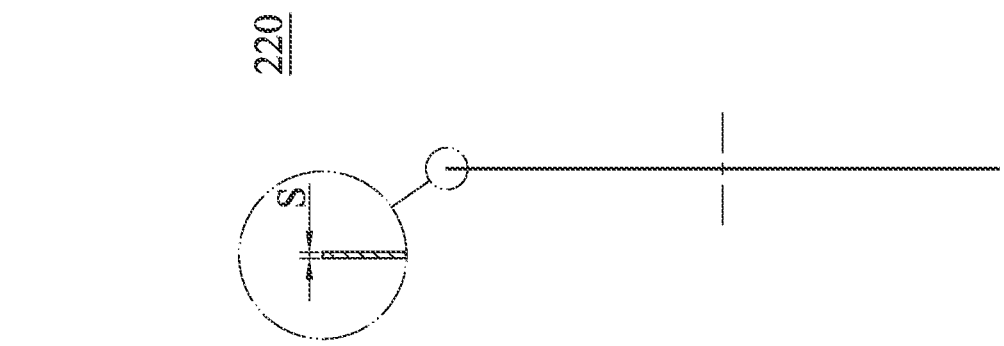
FIG. 10A is a cross-sectional view of a single-piece-formed light blocking sheet of the imaging lens assembly according to the 1st example of the 2nd embodiment of FIG. 9A.
Figure 10B:
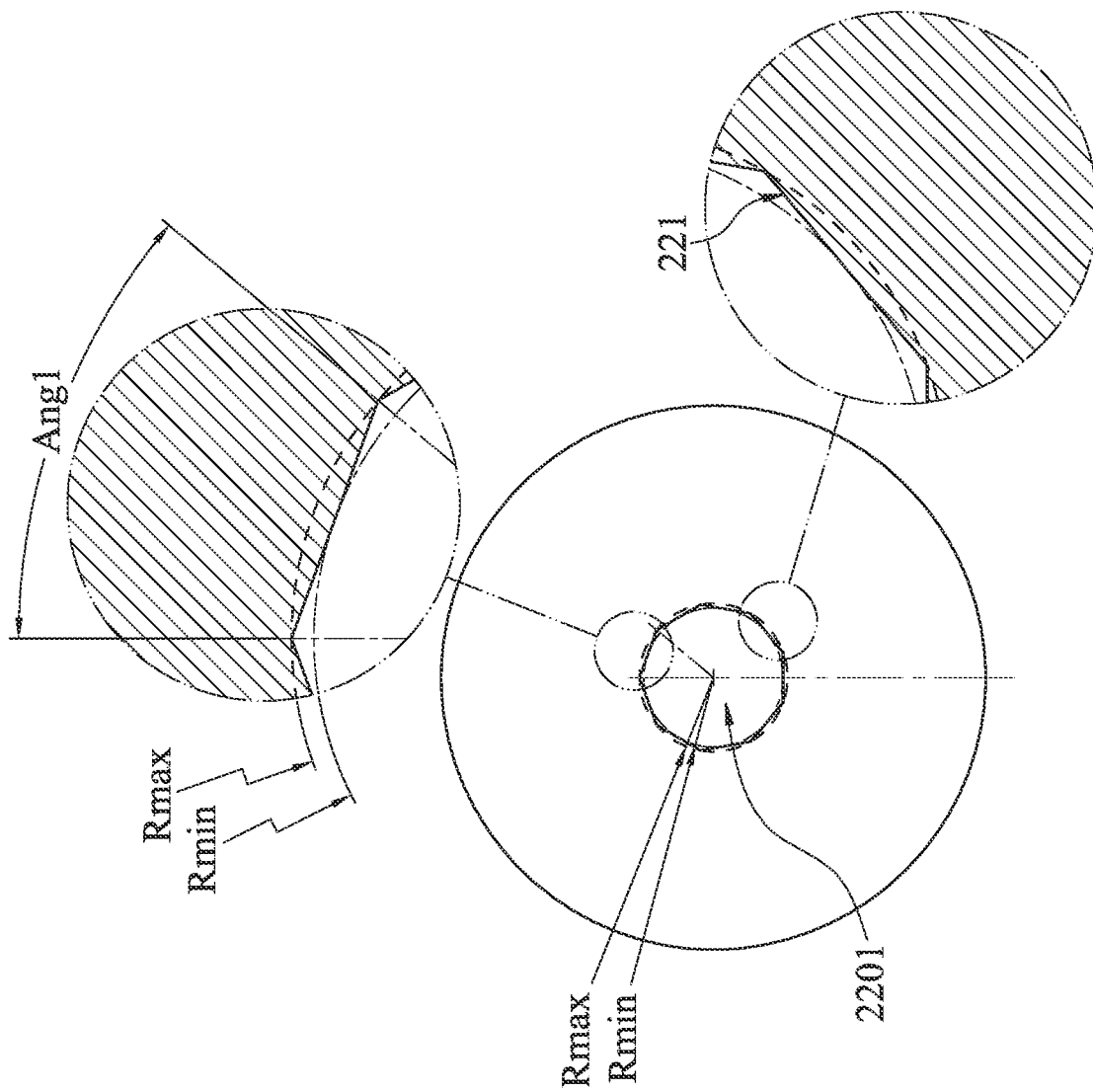
FIG. 10B is a schematic view of the single-piece-formed light blocking sheet of FIG. 10A.

FIG. 10A is a cross-sectional view of a single-piece-formed light blocking sheet 220 of the imaging lens assembly 200 according to the 1st example of the 2nd embodiment of FIG. 9A. FIG. 10B is a schematic view of the single-piece-formed light blocking sheet 220 of FIG. 10A. As shown in FIG. 10A and FIG. 10B, the single-piece-formed light blocking sheet 220 has a central aperture 2201 corresponding to the lens barrel 201 and the optical lens elements. A maximum aperture diameter is defined by the central aperture 2201, and a minimum inner radius of the central aperture 2201 is defined near a center of each of a plurality of light blocking structures 221. The single-piece-formed light blocking sheet 220 includes the plurality of light blocking structures 221 surrounding and disposed adjacent to the central aperture 2201. The center of each of the light blocking structures 221 is closer to a center of the central aperture 2201 than two ends of each of the light blocking structures 221, and the two ends of each of the light blocking structures 221 extend toward the maximum aperture diameter of the central aperture 2201. In FIG. 10B, a number of the light blocking structures 221 is nine, and when an angle between the connecting lines from the center of the central aperture 2201 to the two ends of each of the light blocking structures 221 is Ang1, Ang1 is 40 degrees, but the present disclosure is not limited thereto.

In the 1st example of the 2nd embodiment, when a maximum aperture radius of the central aperture 2201 is Rmax, the minimum inner radius of the central aperture 2201 is Rmin, a roundness coefficient of the central aperture 2201 is tc, a thickness of the single-piece-formed light blocking sheet 220 is S, and a focal length of the imaging lens assembly 200 is f, wherein $t=Rmax-Rmin$, $tc=((Rmax-Rmin)/Rmax) \times 100\% = t/Rmax \times 100\%$, and $F=f/2Rmax$, the parameters satisfy the conditions shown in Table 2A.

TABLE 2A

| Rmax (mm) | 0.7485 | S (μm) | 16 |
|---|---|---|---|
| Rmin (mm) | 0.7033 | f (mm) | 3.05 |
| t | 0.0452 | F | 2.038 |
| tc (%) | 6.04 | | |

Figure 11A:
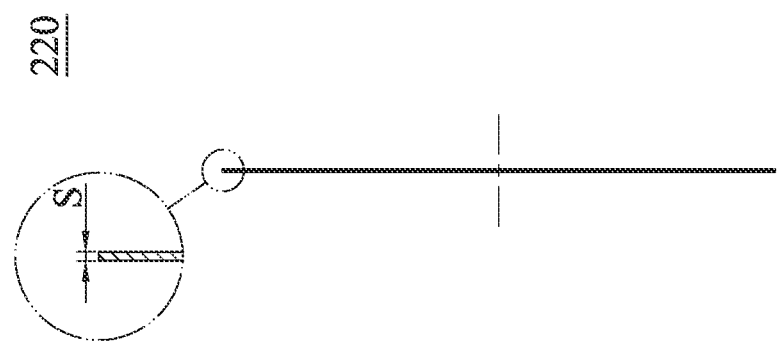
FIG. 11A is a cross-sectional view of a single-piece-formed light blocking sheet of the imaging lens assembly according to the 2nd example of the 2nd embodiment of FIG. 9A.
Figure 11B:
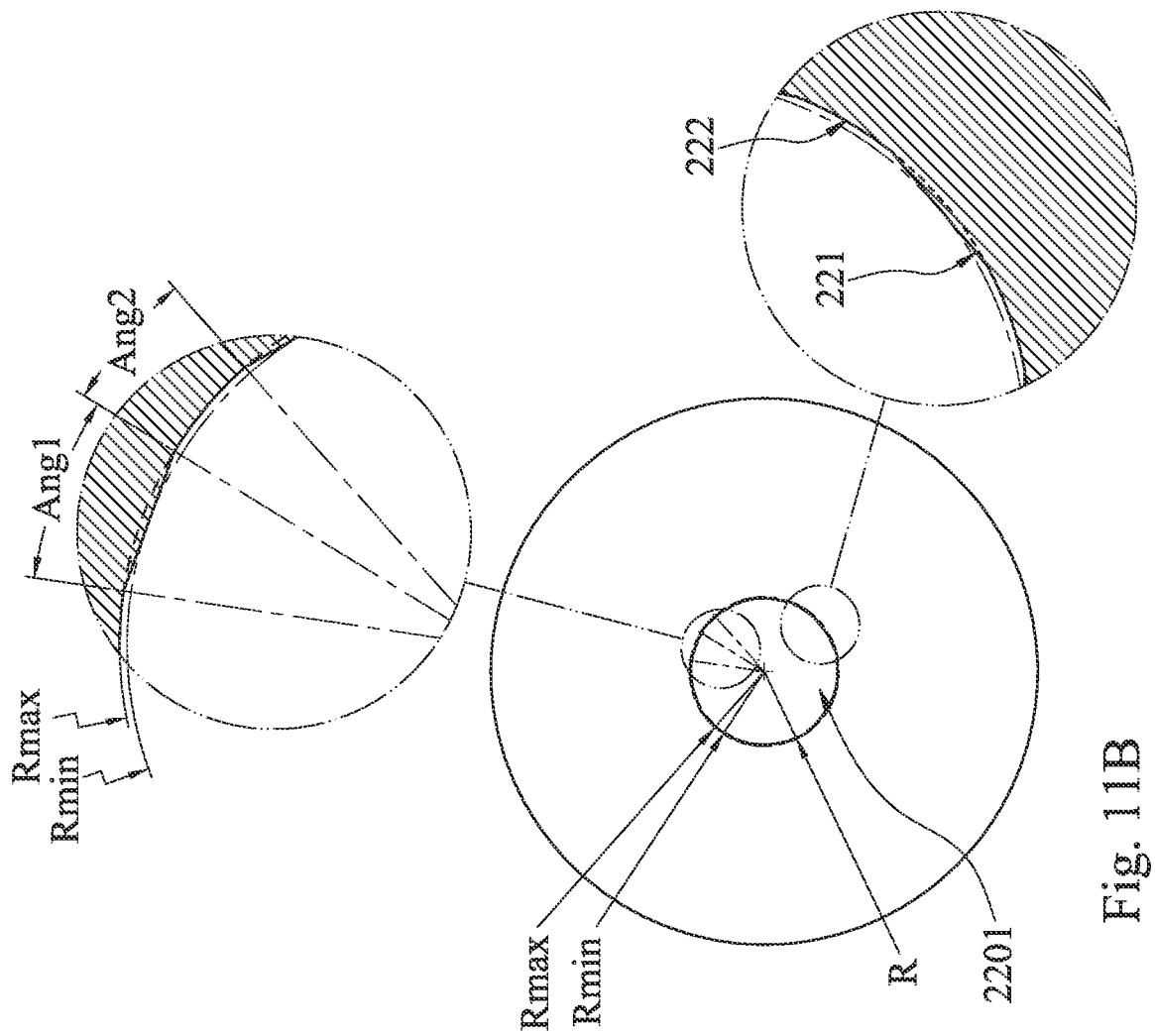
FIG. 11B is a schematic view of the single-piece-formed light blocking sheet of FIG. 11A.

FIG. 11A is a cross-sectional view of a single-piece-formed light blocking sheet 220 of the imaging lens assembly 200 according to the 2nd example of the 2nd embodiment of FIG. 9A. FIG. 11B is a schematic view of the single-piece-formed light blocking sheet 220 of FIG. 11A. As shown in FIG. 11A and FIG. 11B, the single-piece-formed light blocking sheet 220 has a central aperture 2201 corresponding to the lens barrel 201 and the optical lens elements. A maximum aperture diameter is defined by the central aperture 2201, and a minimum inner radius of the central aperture 2201 is defined near a center of each of a plurality of light blocking structures 221. The single-piece-formed light blocking sheet 220 includes the plurality of light blocking structures 221 and a plurality of radius structures 222. The light blocking structures 221 and the radius structures 222 surround and are disposed adjacent to the central aperture 2201, and the light blocking structures 221 and the radius structures 222 are disposed alternately and surround the central aperture 2201. The center of each of the light blocking structures 221 is closer to a center of the central aperture 2201 than two ends of each of the light blocking structures 221, the two ends of each of the light blocking structures 221 extend toward the maximum aperture diameter of the central aperture 2201, and each of the radius structures 222 is connected to two of the light blocking structures 221 adjacent thereto. In FIG. 11B, a number of the light blocking structures 221 is nine, and each of the light blocking structures 221 is a straight-line segment. A number of the radius structures 222 is nine, and each of the radius structures 222 is arc-shaped. When an angle between the connecting lines from the center of the central aperture 2201 to the two ends of each of the light blocking structures 221 is Ang1, Ang1 is 23.086 degrees, but the present disclosure is not limited thereto. When an angle between the connecting lines from the center of the central aperture 2201 to the two ends of each of the radius structures 222 is Ang2, Ang2 is 16.914 degrees, but the present disclosure is not limited thereto.

In the 2nd example of the 2nd embodiment, when a maximum aperture radius of the central aperture 2201 is Rmax, the minimum inner radius of the central aperture 2201 is Rmin, a roundness coefficient of the central aperture 2201 is tc, a thickness of the single-piece-formed light blocking sheet 220 is S, a focal length of the imaging lens assembly 200 is f, and a curvature radius of each of the radius structures 222 is R, wherein $t=Rmax-Rmin$, $tc=((Rmax-Rmin)/Rmax) \times 100\% = t/Rmax \times 100\%$, and $F=f/2Rmax$, the parameters satisfy the conditions shown in Table 2B.

TABLE 2B

| Rmax (mm) | 0.7485 | S (μm) | 23 |
|---|---|---|---|
| Rmin (mm) | 0.7333 | f (mm) | 3.05 |

TABLE 2B-continued

| t | 0.0152 | F | 2.038 |
|---|---|---|---|
| tc (%) | 2.03 | R (mm) | 0.7485 |

Figure 12A:
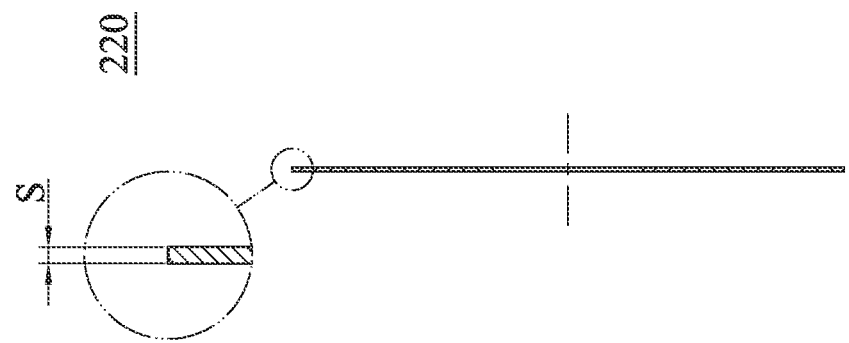
FIG. 12A is a cross-sectional view of a single-piece-formed light blocking sheet of the imaging lens assembly according to the 3rd example of the 2nd embodiment of FIG. 9A.
Figure 12B:
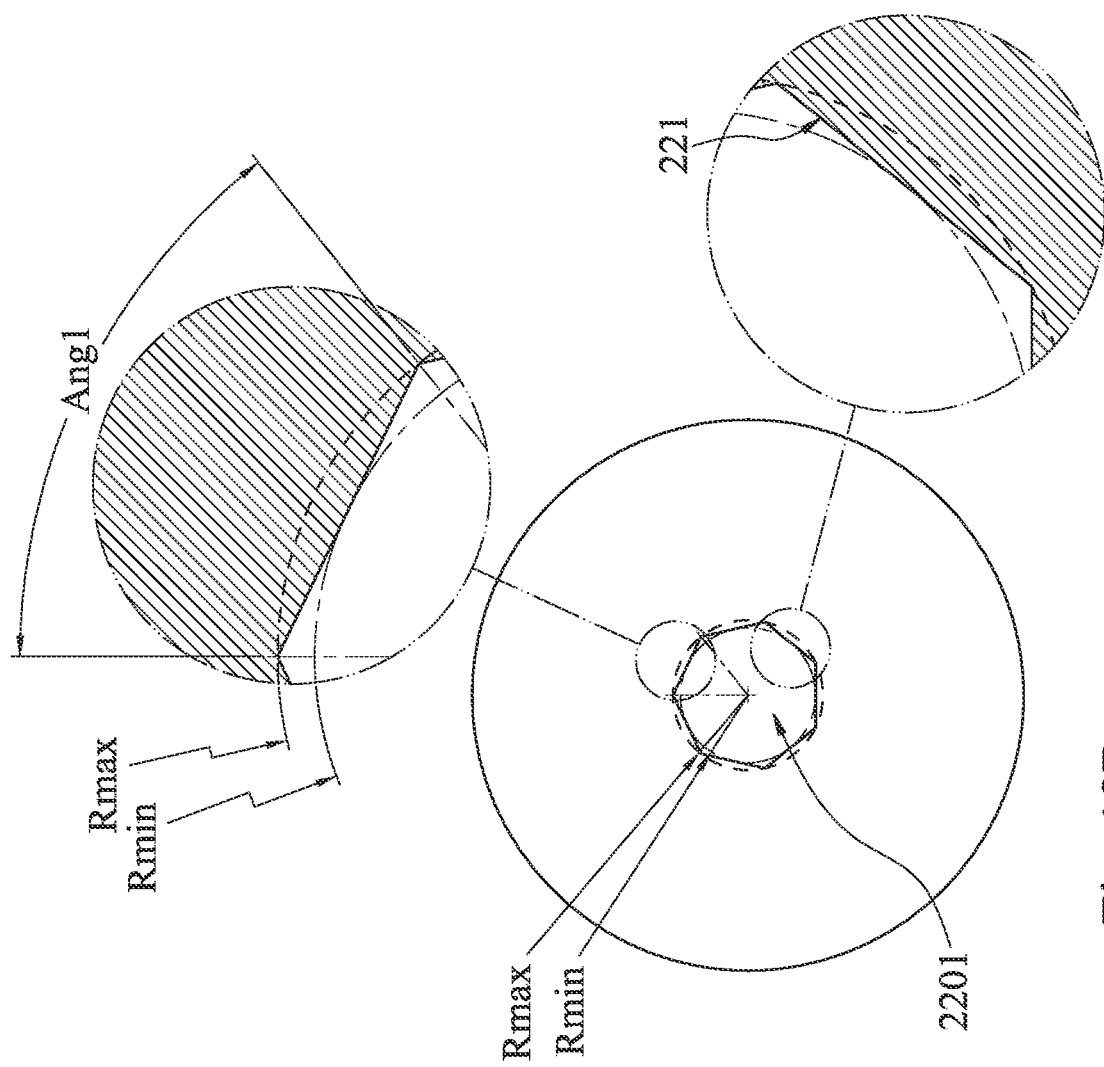
FIG. 12B is a schematic view of the single-piece-formed light blocking sheet of FIG. 12A.

FIG. 12A is a cross-sectional view of a single-piece-formed light blocking sheet 220 of the imaging lens assembly 200 according to the 3rd example of the 2nd embodiment of FIG. 9A. FIG. 12B is a schematic view of the single-piece-formed light blocking sheet 220 of FIG. 12A. As shown in FIG. 12A and FIG. 12B, the single-piece-formed light blocking sheet 220 has a central aperture 2201 corresponding to the lens barrel 201 and the optical lens elements. A maximum aperture diameter is defined by the central aperture 2201, and a minimum inner radius of the central aperture 2201 is defined near a center of each of a plurality of light blocking structures 221. The single-piece-formed light blocking sheet 220 includes the plurality of light blocking structures 221 surrounding and disposed adjacent to the central aperture 2201. The center of each of the light blocking structures 221 is closer to a center of the central aperture 2201 than two ends of each of the light blocking structures 221, and the two ends of each of the light blocking structures 221 extend toward the maximum aperture diameter of the central aperture 2201. In FIG. 12B, a number of the light blocking structures 221 is seven, and when an angle between the connecting lines from the center of the central aperture 2201 to the two ends of each of the light blocking structures 221 is Ang1, Ang1 is 51.429 degrees, but the present disclosure is not limited thereto.

In the 3rd example of the 2nd embodiment, when a maximum aperture radius of the central aperture 2201 is Rmax, the minimum inner radius of the central aperture 2201 is Rmin, a roundness coefficient of the central aperture 2201 is tc, a thickness of the single-piece-formed light blocking sheet 220 is S, and a focal length of the imaging lens assembly 200 is f, wherein t=Rmax−Rmin, tc=((Rmax−Rmin)/Rmax)×100%=t/Rmax×100%, and F=f/2Rmax, the parameters satisfy the conditions shown in Table 2C.

TABLE 2C

| Rmax (mm) | 0.7485 | S (μm) | 41 |
|---|---|---|---|
| Rmin (mm) | 0.6743 | f (mm) | 3.05 |
| t | 0.0742 | F | 2.038 |
| tc (%) | 9.91 | | |

Figure 13A:
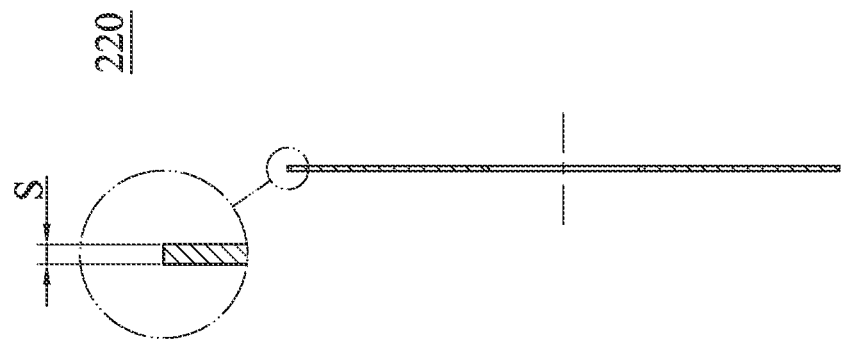
FIG. 13A is a cross-sectional view of a single-piece-formed light blocking sheet of the imaging lens assembly according to the 4th example of the 2nd embodiment of FIG. 9A.
Figure 13B:
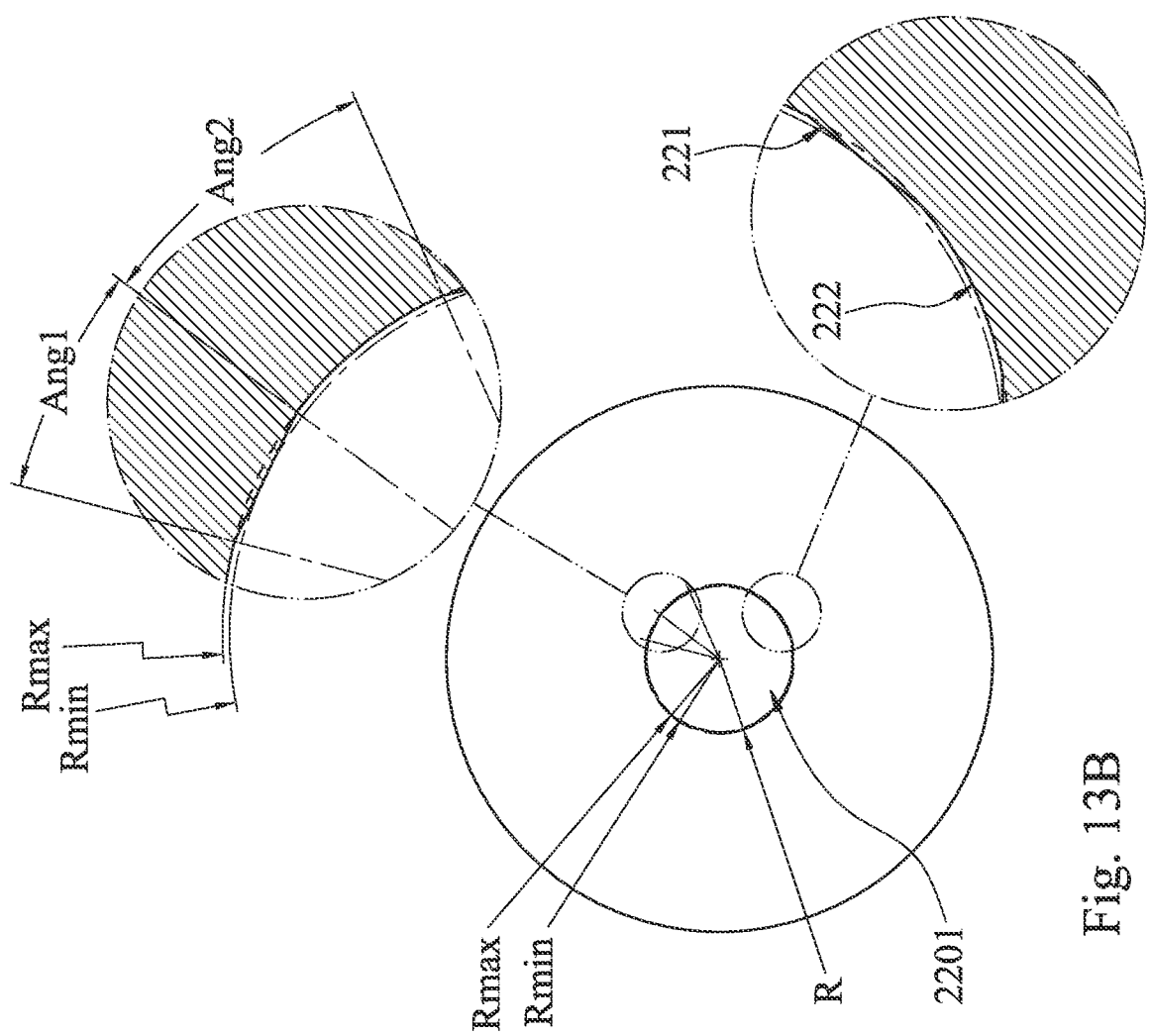
FIG. 13B is a schematic view of the single-piece-formed light blocking sheet of FIG. 13A.

FIG. 13A is a cross-sectional view of a single-piece-formed light blocking sheet 220 of the imaging lens assembly 200 according to the 4th example of the 2nd embodiment of FIG. 9A. FIG. 13B is a schematic view of the single-piece-formed light blocking sheet 220 of FIG. 13A. As shown in FIG. 13A and FIG. 13B, the single-piece-formed light blocking sheet 220 has a central aperture 2201 corresponding to the lens barrel 201 and the optical lens elements. A maximum aperture diameter is defined by the central aperture 2201, and a minimum inner radius of the central aperture 2201 is defined near a center of each of a plurality of light blocking structures 221. The single-piece-formed light blocking sheet 220 includes the plurality of light blocking structures 221 and a plurality of radius structures 222. The light blocking structures 221 and the radius structures 222 surround and are disposed adjacent to the central aperture 2201, and the light blocking structures 221 and the radius structures 222 are disposed alternately and surround the central aperture 2201. The center of each of the light blocking structures 221 is closer to a center of the central aperture 2201 than two ends of each of the light blocking structures 221, the two ends of each of the light blocking structures 221 extend toward the maximum aperture diameter of the central aperture 2201, and each of the radius structures 222 is connected to two of the light blocking structures 221 adjacent thereto. In FIG. 13B, a number of the light blocking structures 221 is seven, and each of the light blocking structures 221 is a straight-line segment. A number of the radius structures 222 is seven, and each of the radius structures 222 is arc-shaped. When an angle between the connecting lines from the center of the central aperture 2201 to the two ends of each of the light blocking structures 221 is Ang1, Ang1 is 22.294 degrees, but the present disclosure is not limited thereto. When an angle between the connecting lines from the center of the central aperture 2201 to the two ends of each of the radius structures 222 is Ang2, Ang2 is 29.135 degrees, but the present disclosure is not limited thereto.

In the 4th example of the 2nd embodiment, when a maximum aperture radius of the central aperture 2201 is Rmax, the minimum inner radius of the central aperture 2201 is Rmin, a roundness coefficient of the central aperture 2201 is tc, a thickness of the single-piece-formed light blocking sheet 220 is S, a focal length of the imaging lens assembly 200 is f, and a curvature radius of each of the radius structures 222 is R, wherein t=Rmax−Rmin, tc=((Rmax−Rmin)/Rmax)×100%=t/Rmax×100%, and F=f/2Rmax, the parameters satisfy the conditions shown in Table 2D.

TABLE 2D

| Rmax (mm) | 0.7485 | S (μm) | 50 |
|---|---|---|---|
| Rmin (mm) | 0.7343 | f (mm) | 3.05 |
| t | 0.0142 | F | 2.038 |
| tc (%) | 1.90 | R (mm) | 0.7485 |

3rd Embodiment

Figure 14A:
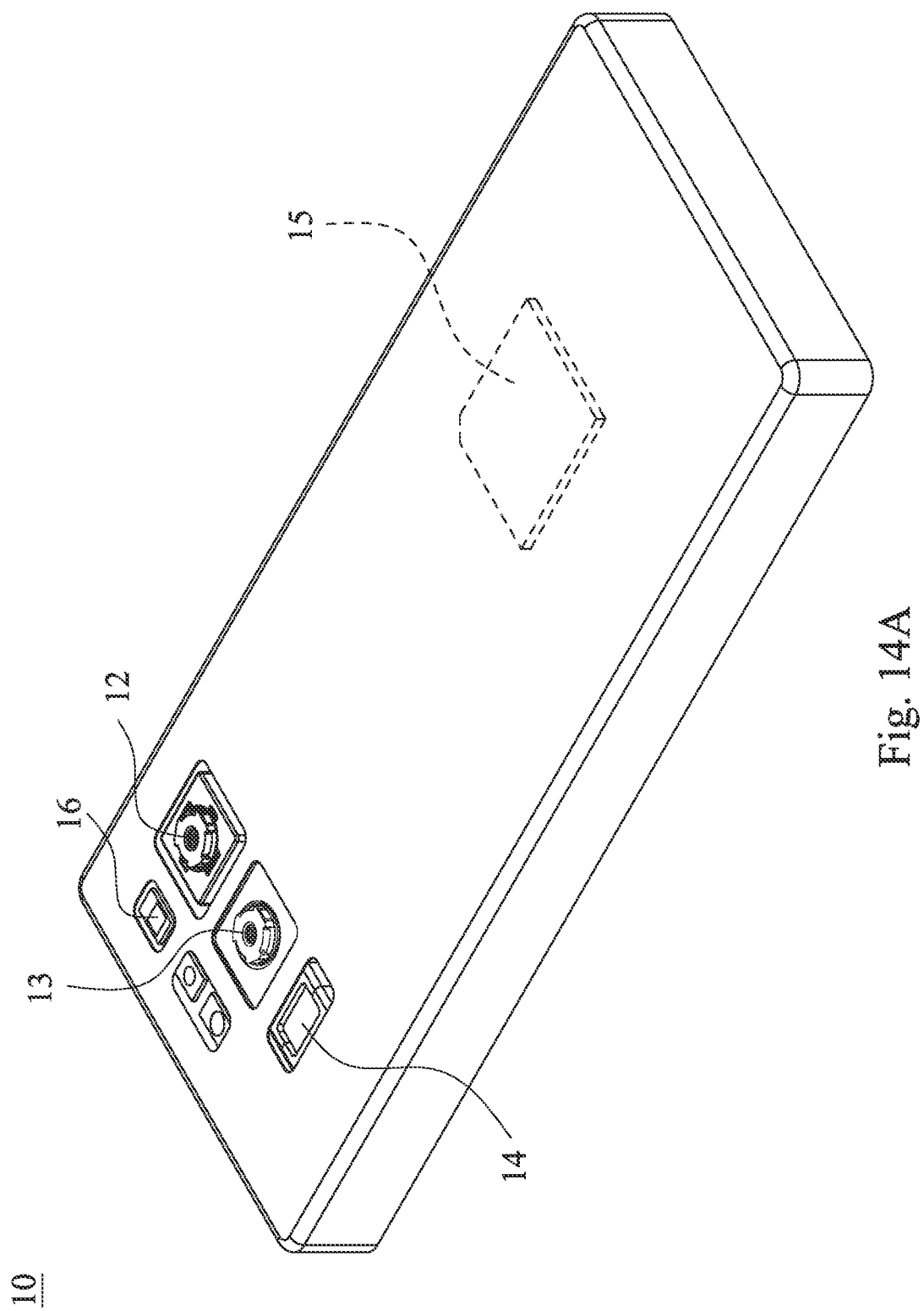
FIG. 14A is a schematic view of an electronic device according to the 3rd embodiment of the present disclosure.
Figure 14B:
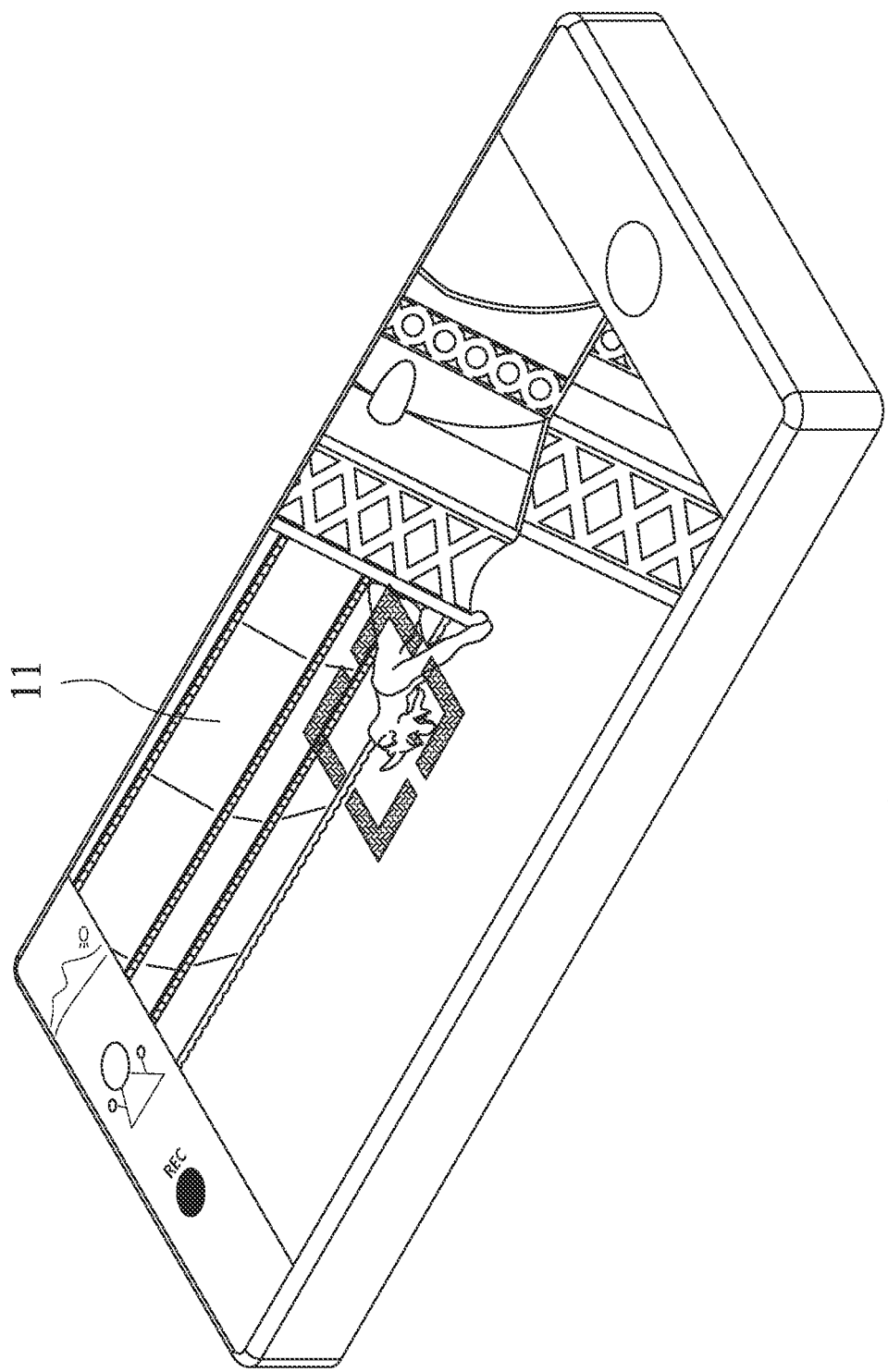
FIG. 14B is another schematic view of the electronic device according to the 3rd embodiment of FIG. 14A.

FIG. 14A is a schematic view of an electronic device 10 according to the 3rd embodiment of the present disclosure. FIG. 14B is another schematic view of the electronic device 10 according to the 3rd embodiment of FIG. 14A. As shown in FIG. 14A and FIG. 14B, the electronic device 10 is a smartphone. The electronic device 10 includes three camera modules 12, 13, 14 and a user interface 11. Each of the camera modules 12, 13, 14 includes an imaging lens assembly (figure is omitted) and an image sensor (figure is omitted). The image sensor is disposed on an image surface (figure is omitted) of the imaging lens assembly. In detail, the imaging lens assembly can be the imaging lens assembly according to any one of the aforementioned examples of the 1st embodiment and the 2nd embodiment, but the present disclosure is not limited thereto. Further, the camera module 12 is an ultra-wide-angle camera module, the camera module 13 is a high-pixel camera module, the camera module 14 is a telephoto camera module, and the user interface 11 is a touch screen, but the present disclosure is not limited thereto.

A user enters a shooting mode via the user interface 11. The user interface 11 is used to display the screen, and the shooting angle can be manually adjusted to switch between different camera modules 12, 13, 14. At this moment, the camera modules 12, 13, 14 collect an imaging light on the respective image sensor and output electronic signals associated with images to an image signal processor (ISP) 15.

As shown in FIG. 14A and FIG. 14B, according to the camera specifications of the electronic device 10, the electronic device 10 can further include an optical anti-shake mechanism (figure is omitted). Further, the electronic device 10 can further include at least one focusing assisting module (figure is omitted) and at least one sensing component (figure is omitted). The focusing assisting module can be a flash module 16, an infrared distance measurement component, a laser focus module, etc. The flash module 16 is for compensating the color temperature. The sensing component can have functions for sensing physical momentum and kinetic energies, such as an accelerator, a gyroscope, and a Hall effect element, so as to sense shaking or jitters applied by hands of the user or external environments. Thus the autofocus function and the optical anti-shake mechanism of the imaging lens assembly disposed on the electronic device 10 can function to obtain a great image quality and facilitate the electronic device 10 according to the present disclosure to have a capturing function with multiple modes, such as taking optimized selfies, high dynamic range (HDR) with a low light source, 4K resolution recording, etc. Furthermore, the user can visually see the captured image of the camera through the user interface 11 and manually operate the view finding range on the user interface 11 to achieve the auto focus function of what you see is what you get.

Furthermore, the imaging lens assembly, the image sensor, the optical anti-shake mechanism, the sensing component and the focusing assisting module can be disposed on a flexible printed circuit board (FPC) (figure is omitted) and electrically connected to the image signal processor 15 and so on via a connector (figure is omitted) so as to operate a picturing process. Recent electronic devices such as smartphones have a trend towards thinness and lightness. The imaging lens assembly and the related elements are disposed on a FPC and circuits are assembled into a main board of an electronic device by a connector. Hence, it can fulfill a mechanical design of a limited inner space of the electronic device and a requirement of a circuit layout and obtain a larger allowance, and it is also favorable for an autofocus function of the imaging lens assembly obtaining a flexible control via a touch screen of the electronic device. In the 3rd embodiment, the electronic device 10 can include a plurality of the sensing components and a plurality of the focusing assisting modules, and the sensing components and the focusing assisting modules are disposed on an FPC and another at least one FPC (figure is omitted) and electrically connected to the image signal processor 15 and so on via a corresponding connector so as to operate a picturing process. In other embodiments (figure is omitted), the sensing components and auxiliary optical elements can be disposed on a main board of an electronic device or a board of the other form according to a mechanical design and a requirement of a circuit layout.

Furthermore, the electronic device 10 can further include, but not be limited to, a display, a control unit, a storage unit, a random-access memory (RAM), a read-only memory (ROM), or the combination thereof.

Figure 14C:
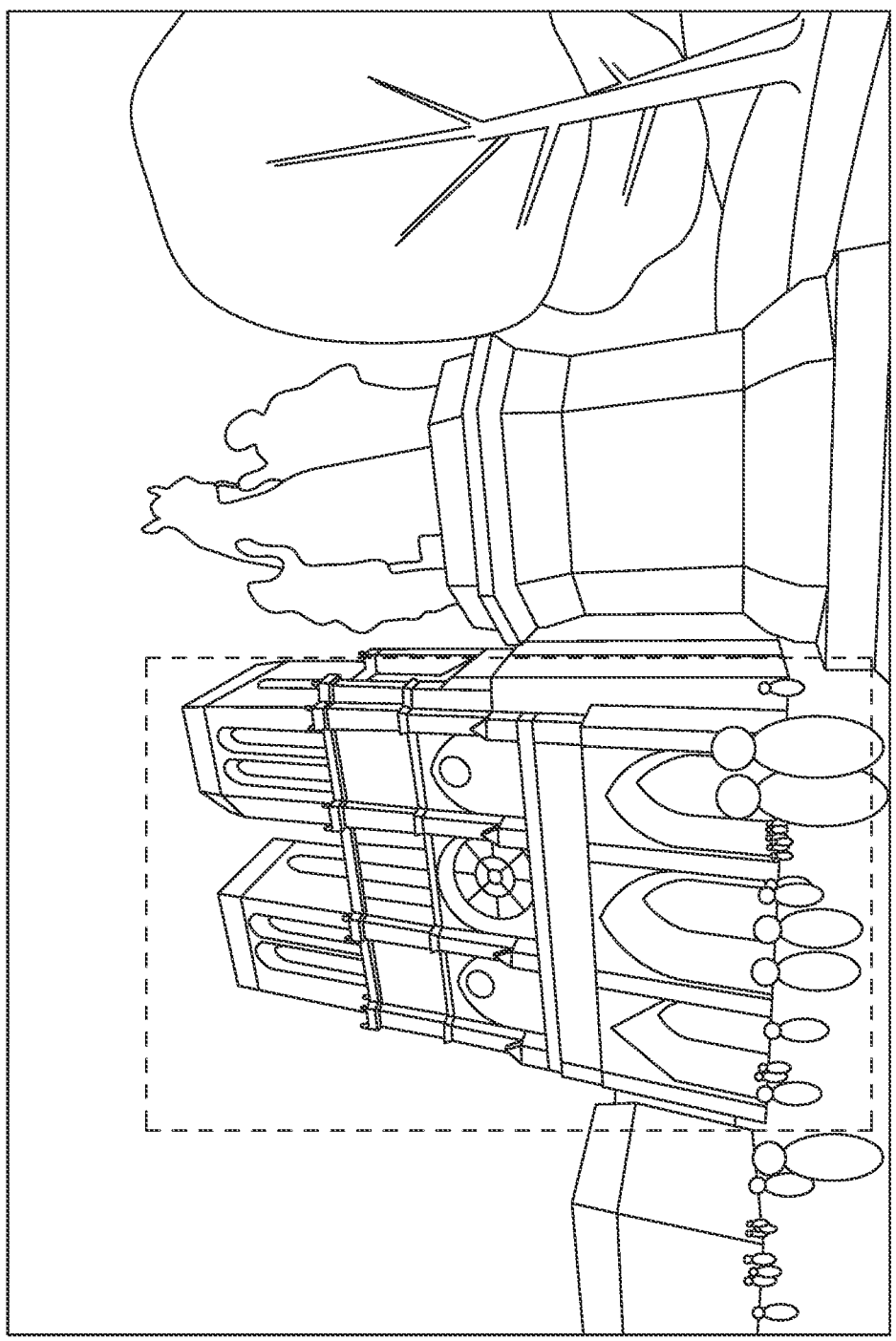
FIG. 14C is a schematic view of an image captured via the electronic device according to the 3rd embodiment of FIG. 14A.

FIG. 14C is a schematic view of an image captured via the electronic device 10 according to the 3rd embodiment of FIG. 14A. As shown in FIG. 14C, a larger ranged image can be captured via the camera module 12 (that is, the ultra-wide-angle camera module), and the camera module 12 has a function for containing more views.

Figure 14D:
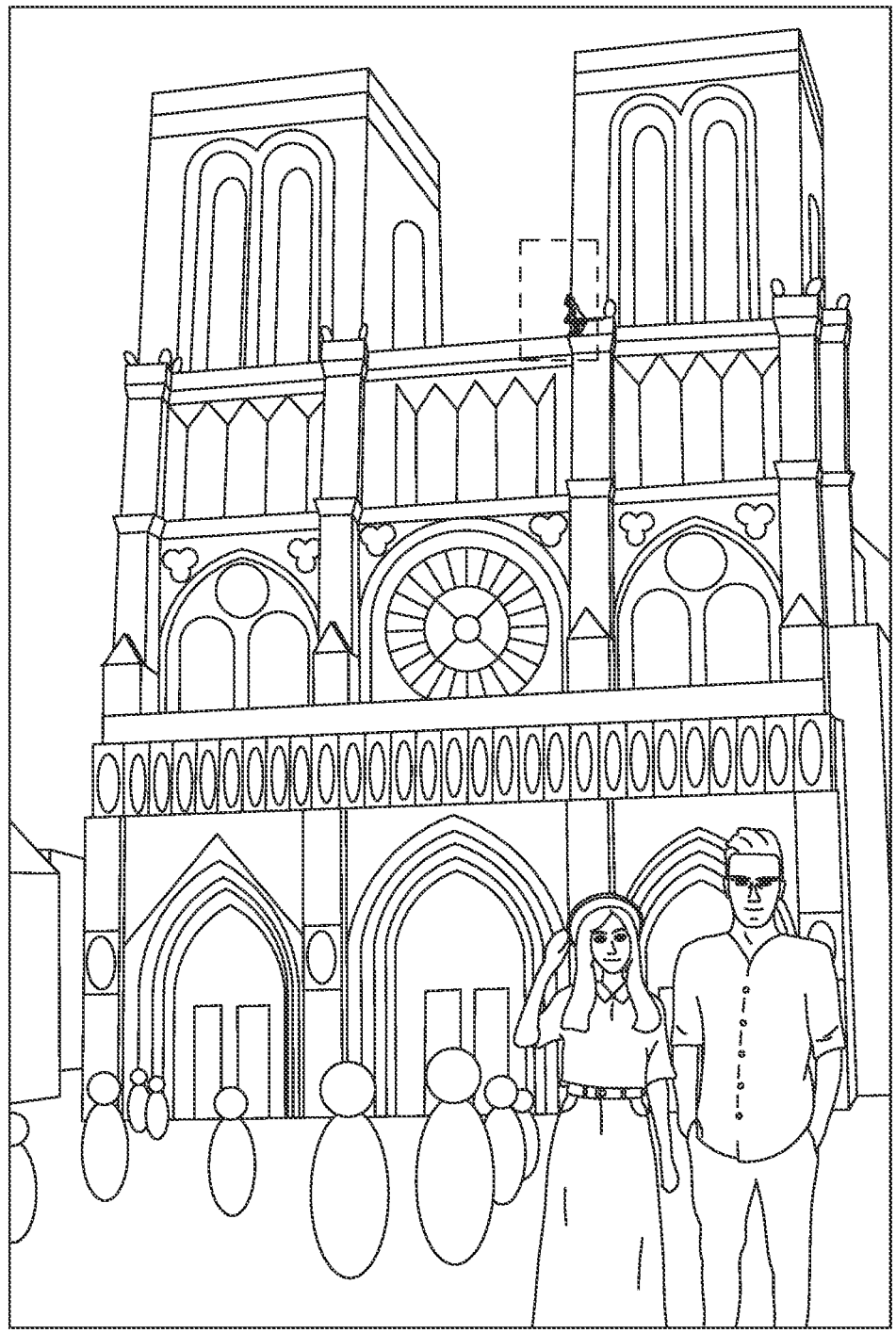
FIG. 14D is another schematic view of the image captured via the electronic device according to the 3rd embodiment of FIG. 14A.

FIG. 14D is another schematic view of the image captured via the electronic device 10 according to the 3rd embodiment of FIG. 14A. As shown in FIG. 14D, a certain ranged and high-pixel image can be captured via the camera module 13 (that is, the high-pixel camera module), and the camera module 13 has a function for high resolution and low distortion.

Figure 14E:
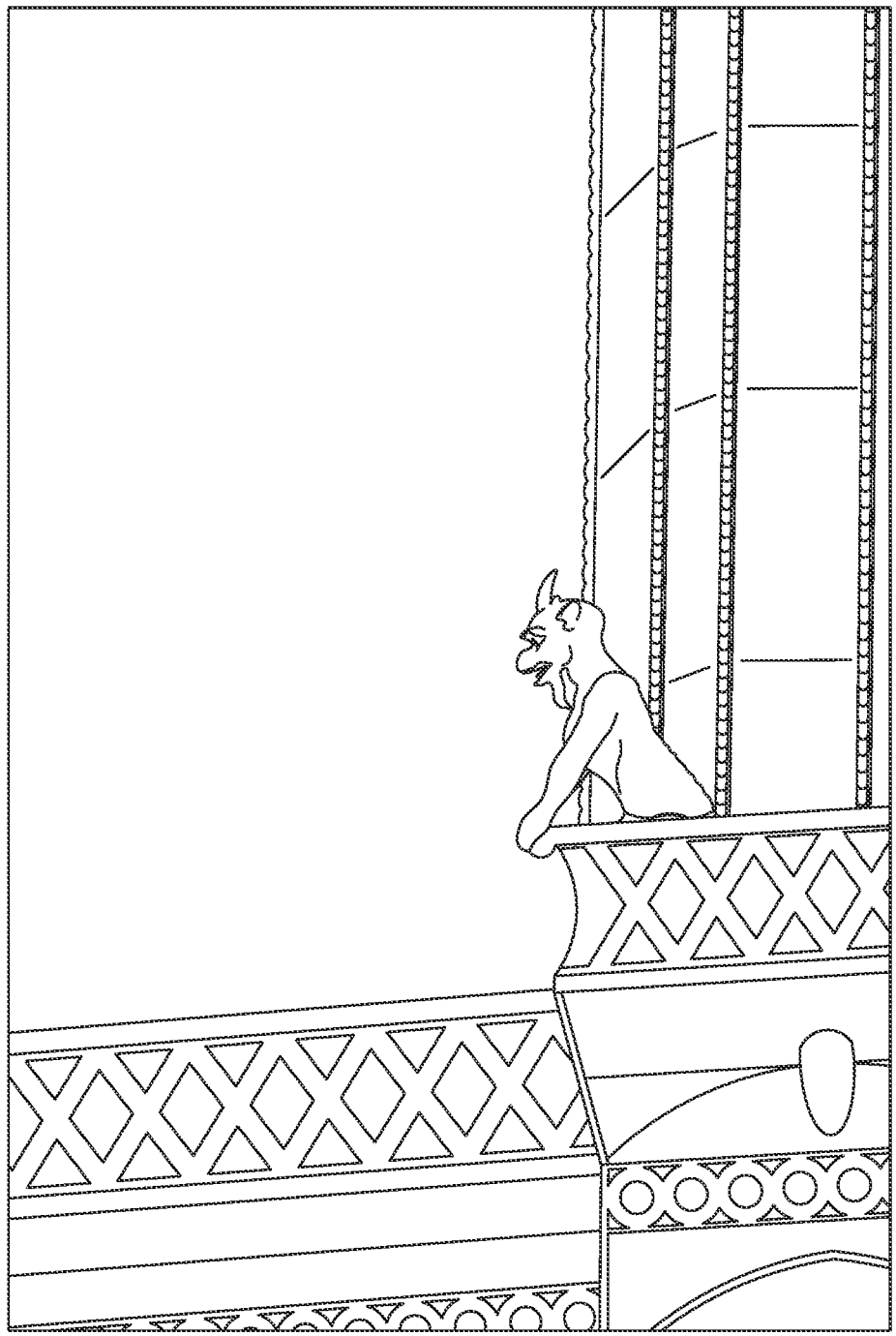
FIG. 14E is the other schematic view of the image captured via the electronic device according to the 3rd embodiment of FIG. 14A.

FIG. 14E is the other schematic view of the image captured via the electronic device 10 according to the 3rd embodiment of FIG. 14A. As shown in FIG. 14E, a far image can be captured and enlarged to a high magnification via the camera module 14 (that is, the telephoto camera module), and the camera module 14 has a function for a high magnification.

As shown in FIG. 14C to FIG. 14E, when an image is captured via different camera modules 12, 13, 14 having various focal lengths and processed via a technology of an image processing, a zoom function of the electronic device 10 can be achieved.

4th Embodiment

Figure 15:
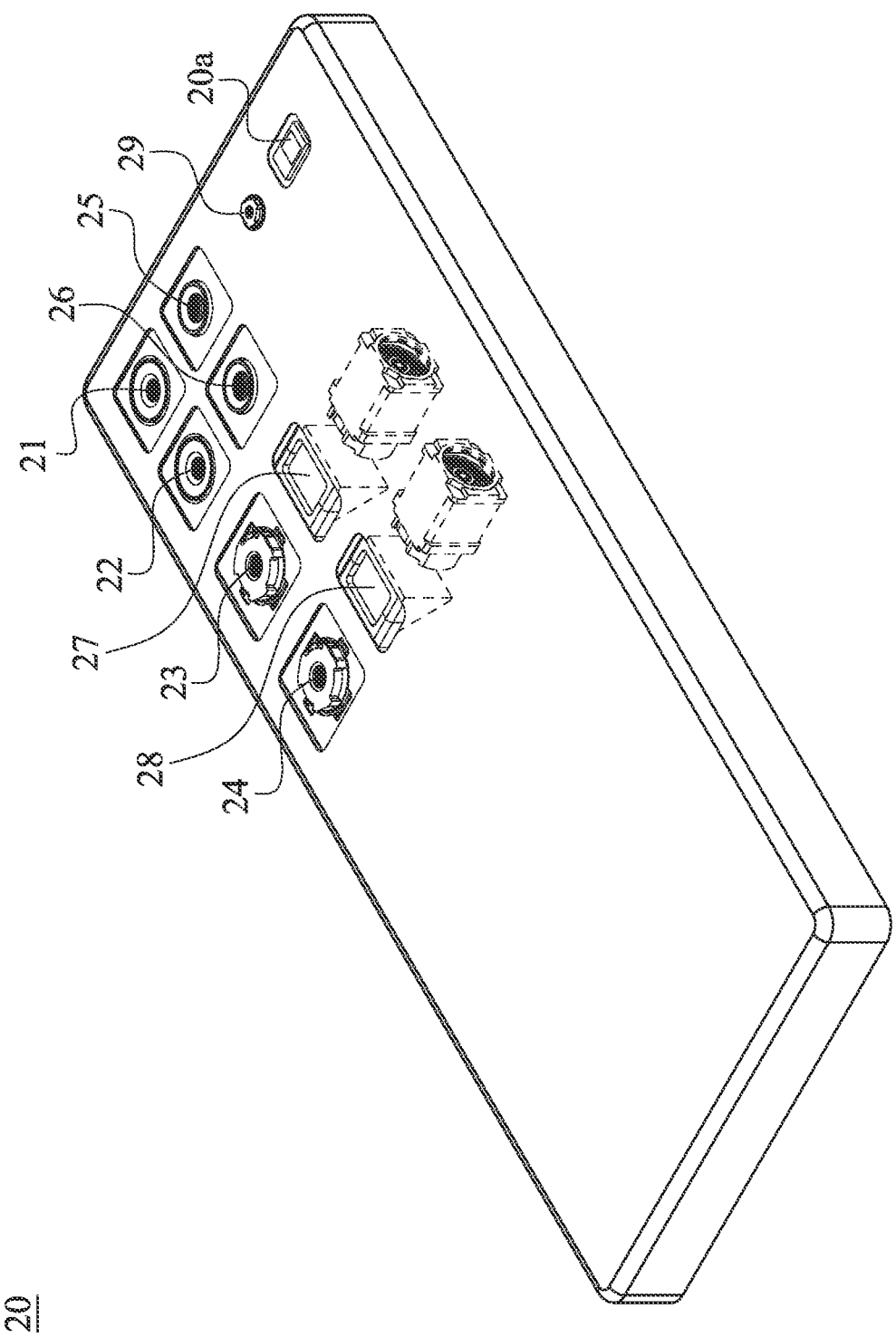
FIG. 15 is a schematic view of an electronic device according to the 4th embodiment of the present disclosure.

FIG. 15 is a schematic view of an electronic device 20 according to the 4th embodiment of the present disclosure. As shown in FIG. 15, the electronic device 20 is a smartphone. The electronic device 20 includes a plurality of camera modules 21, 22, 23, 24, 25, 26, 27, 28, 29. Each of the camera modules 21, 22, 23, 24, 25, 26, 27, 28, 29 includes an imaging lens assembly (figure is omitted) and an image sensor (figure is omitted). The image sensor is disposed on an image surface (figure is omitted) of the imaging lens assembly. In detail, the imaging lens assembly can be the imaging lens assembly according to any one of the aforementioned examples of the 1st embodiment and the 2nd embodiment, but not be limited thereto. Further, the camera modules 21, 22 are ultra-wide-angle camera modules, the camera modules 23, 24 are wide angle camera modules, and the camera modules 25, 26, 27, 28 are telephoto camera modules, wherein the camera modules 27, 28 are configured to fold the light. The camera module 29 is a Time-Of-Flight (TOF) module and can further include other types of imaging lens assembly, and it is not limited to the imaging lens assembly of the present disclosure.

According to the camera specifications of the electronic device 20, the electronic device 20 can further include an optical anti-shake mechanism (figure is omitted). Further, the electronic device 20 can further include at least one focusing assisting module (figure is omitted) and at least one sensing component (figure is omitted). The focusing assisting module can be a flash module 20a, an infrared distance measurement component, a laser focus module, etc. The flash module 20a is for compensating the color temperature. The sensing component can have functions for sensing physical momentum and kinetic energies, such as an accelerator, a gyroscope, and a Hall effect element, so as to sense shaking or jitters applied by hands of the user or external environments. Thus the autofocus function and the optical anti-shake mechanism of the imaging lens assembly disposed on the electronic device 20 can function to obtain a great image quality and facilitate the electronic device 20 according to the present disclosure to have a capturing function with multiple modes, such as taking optimized selfies, high dynamic range (HDR) with a low light source, 4K resolution recording, etc.

Further, all of other structures and dispositions according to the 4th embodiment are the same as the structures and the dispositions according to the 3rd embodiment, and will not be described again herein.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly, comprising:
    a plurality of optical lens elements;
    a single-piece-formed light blocking sheet corresponding to the plurality of optical lens elements; and
    a lens barrel having a circular light-passing hole corresponding to the plurality of optical lens elements and the single-piece-formed light blocking sheet;
    wherein the single-piece-formed light blocking sheet has a central aperture corresponding to the lens barrel and the plurality of optical lens elements, a maximum aperture diameter is defined by the central aperture, the single-piece-formed light blocking sheet comprises a plurality of light blocking structures surrounding and disposed adjacent to the central aperture, a number of the plurality of light blocking structures is three to ten, a center of each of the light blocking structures is closer to a center of the central aperture than two ends of each of the light blocking structures, and the two ends of each of the light blocking structures extend toward the maximum aperture diameter of the central aperture;
    wherein a maximum aperture radius of the central aperture is Rmax, a minimum inner radius of the central aperture is defined near the center of each of the light blocking structures, the minimum inner radius is Rmin, a roundness coefficient of the central aperture is tc, and the following condition is satisfied:

$0.41\% \leq tc \leq 10.2\%$, wherein $tc=((R\text{max}-R\text{min})/R\text{max})\times 100\%$;

wherein the single-piece-formed light blocking sheet further comprises a plurality of radius structures, the plurality of radius structures surround and are disposed adjacent to the central aperture, a number of the plurality of radius structures is three to ten, each of the radius structures is connected to two of the light blocking structures adjacent thereto, and each of the radius structures is arc-shaped.

2. The imaging lens assembly of claim 1, wherein a curvature radius of each of the radius structures is R, and the following condition is satisfied:

$0.25 \text{ mm} < R < 4.2 \text{ mm}$.

3. The imaging lens assembly of claim 1, wherein the maximum aperture radius of the central aperture is Rmax, a curvature radius of each of the radius structures is R, and the following condition is satisfied:

$R = R\text{max}$.

4. The imaging lens assembly of claim 1, wherein the plurality of radius structures and the plurality of light blocking structures are disposed alternately and surround the central aperture.

5. The imaging lens assembly of claim 1, wherein a focal length of the imaging lens assembly is f, the maximum aperture radius of the central aperture is Rmax, and the following condition is satisfied:

$0.9 < F < 3.25$, wherein $F = f/2R\text{max}$.

6. The imaging lens assembly of claim 1, wherein the single-piece-formed light blocking sheet further comprises a plurality of radius structures, the plurality of radius structures surround and are disposed adjacent to the central aperture, each of the radius structures is connected to two of the light blocking structures adjacent thereto, each of the light blocking structures is a straight-line segment, and each of the radius structures is arc-shaped.

7. The imaging lens assembly of claim 1, wherein the roundness coefficient of the central aperture is tc, and the following condition is satisfied:

$0.83\% \leq tc \leq 8.6\%$.

8. The imaging lens assembly of claim 7, wherein the roundness coefficient of the central aperture is tc, and the following condition is satisfied:

$0.83\% \leq tc \leq 6.8\%$.

9. The imaging lens assembly of claim 1, wherein the roundness coefficient of the central aperture is tc, and the following condition is satisfied:

$0.68\% \leq tc \leq 4.1\%$.

10. The imaging lens assembly of claim 1, wherein the number of the plurality of light blocking structures is five to nine.

11. The imaging lens assembly of claim 1, wherein a thickness of the single-piece-formed light blocking sheet is S, and the following condition is satisfied:

$5 \text{ μm} < S < 210 \text{ μm}$.

12. An electronic device, comprising:
    the imaging lens assembly of claim 1; and
    an image sensor, wherein the image sensor is disposed on an image surface of the imaging lens assembly.

* * * * *